United States Patent
Ingalls et al.

(10) Patent No.: US 9,329,930 B2
(45) Date of Patent: May 3, 2016

(54) CACHE MEMORY ERROR DETECTION CIRCUITS FOR DETECTING BIT FLIPS IN VALID INDICATORS IN CACHE MEMORY FOLLOWING INVALIDATE OPERATIONS, AND RELATED METHODS AND PROCESSOR-BASED SYSTEMS

(71) Applicant: QUALCOMM Incorporated, San Diego, CA (US)

(72) Inventors: John Sumner Ingalls, Raleigh, NC (US); Brian Michael Stempel, Raleigh, NC (US); Thomas Philip Speier, Wake Forest, NC (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 14/256,360

(22) Filed: Apr. 18, 2014

(65) Prior Publication Data

US 2015/0301884 A1 Oct. 22, 2015

(51) Int. Cl.
*G11C 29/00* (2006.01)
*G06F 11/10* (2006.01)
*G06F 3/06* (2006.01)
*G06F 12/08* (2016.01)

(52) U.S. Cl.
CPC .......... *G06F 11/1004* (2013.01); *G06F 3/0619* (2013.01); *G06F 3/0638* (2013.01); *G06F 3/0674* (2013.01); *G06F 11/1064* (2013.01); *G06F 12/0891* (2013.01)

(58) Field of Classification Search
CPC . G06F 3/0619; G06F 3/0638; G06F 11/1064; G06F 11/1004; G06F 12/0891; G06F 3/0674
See application file for complete search history.

(56) References Cited

U.S. PATENT DOCUMENTS

| 5,809,543 | A * | 9/1998 | Byers .................. G06F 11/1666 711/120 |
| 7,240,277 | B2 | 7/2007 | Anderson et al. |
| 7,328,391 | B2 | 2/2008 | Hart et al. |
| 7,752,505 | B2 | 7/2010 | Gschwind et al. |
| 8,266,498 | B2 | 9/2012 | Moyer |
| 2008/0126702 | A1 * | 5/2008 | Zimoto ................. G06F 3/0625 711/114 |
| 2009/0063907 | A1 * | 3/2009 | Tsuboi ................ G06F 11/0778 714/48 |

(Continued)

OTHER PUBLICATIONS

International Search Report and Written Opinion for PCT/US2015/023269, mailed Jul. 21, 2015, 10 pages.
Author Unknown, "Cache invalidation," Wikipedia, the free encyclopedia, http://en.wikipedia.org/wiki/Cache_invalidation, accessed on Jan. 20, 2014, 1 page.

(Continued)

*Primary Examiner* — Guy Lamarre
(74) *Attorney, Agent, or Firm* — Withrow & Terranova, PLLC

(57) ABSTRACT

Aspects disclosed herein include cache memory error detection circuits for detecting bit flips in valid indicators (e.g., valid bits) in cache memory following invalidate operations. Related methods and processor-based systems are also disclosed. If a cache hit results from access to a cache entry following an invalidate operation, a bit flip(s) has occurred in a valid indicator of the cache entry. This is because the valid indicator should indicate an invalid state following the invalidate operation of the cache entry, as opposed to a valid state. Thus, a cache memory error detection circuit is configured to determine if an invalidate operation was performed on the cache entry. The cache memory error detection circuit can cause a cache miss or an error for the accessed cache entry to be generated as a result, even though the valid indicator for the cache entry indicates a valid state due to the bit flip(s).

28 Claims, 12 Drawing Sheets

(56) References Cited

U.S. PATENT DOCUMENTS

2010/0064206 A1    3/2010   Moyer et al.
2012/0079350 A1    3/2012   Krick
2012/0117428 A1    5/2012   Fukuda
2012/0311380 A1*  12/2012   Moyer .................. G06F 11/073
                                                       714/6.13

OTHER PUBLICATIONS

Author Unknown, "Radiation hardening," Wikipedia, the free encyclopedia, http://en.wikipedia.org/wiki/Radiation_hardening, accessed on Jan. 20, 2014, 10 pages.

* cited by examiner

| CACHE ENTRY (18(0)) EVENTS | VALID INDICATOR (24(0)) | REDUNDANT INFORMATION INDICATOR (46(0)) | CURRENT INVALIDATE INTERVAL COUNT (48) | TAG (20(0)) |
|---|---|---|---|---|
| ESTABLISH EVENT (52) | 1 | 10 | 10 | 0111 |
| INVALIDATE OPERATION (54) | 0 | 10 | 11 | 0111 |
| RADIATION EVENT (56) | 1 | 10 | 11 | 0111 |
| ACCESS EVENT (58) | 1 | 10 | 11 | 0111 |

*FIG. 2*

| CACHE ENTRY (18(0)) EVENTS | VALID INDICATOR (24(0)) | ENCODED REDUNDANT INFORMATION INDICATOR (46'(1)(0)) | CURRENT INVALIDATE INTERVAL COUNT (48(0)) | TAG (20(0)) |
|---|---|---|---|---|
| ESTABLISH EVENT (90) | 1 | 00 | 10 | 0111 |
| INVALIDATE OPERATION (92) | 0 | | | |
| RADIATION EVENT (94) | 1 | 00 | 11 | 0111 |
| | | 00 | 11 | 0111 |
| ACCESS EVENT (96) | 1 | 00 | 11 | 0111 |

FIG. 7

CACHE MEMORY ERROR DETECTION CIRCUITS FOR DETECTING BIT FLIPS IN VALID INDICATORS IN CACHE MEMORY FOLLOWING INVALIDATE OPERATIONS, AND RELATED METHODS AND PROCESSOR-BASED SYSTEMS

BACKGROUND

I. Field of the Disclosure

The field of the present disclosure relates to detecting bit flips in cache memory in processor-based systems.

II. Background

A memory cell is a basic building block of computer data storage, which is also known as "memory." A computer system may either read data from or write data to memory. Memory can be used to provide cache memory in a central processing unit (CPU) system as an example. Cache memory is a smaller, faster memory that stores copies of data stored at frequently accessed memory addresses in main memory or higher level cache memory to reduce memory access latency. Thus, cache memory is memory that can be used by a CPU to reduce memory access times.

Cache memory is comprised of a tag array and a data array. The tag array contains addresses also known as "tags." The tags provide indexes into data storage locations in the data array. A tag in the tag array and data stored at the index of the tag in the data array is also known as a "cache line" or "cache entry." If a memory address, or portion thereof, provided to the cache memory as part of a memory access request matches a tag in the tag array, this is known as a "cache hit." A cache hit means that the data in the data array contained at the index of the matching tag contains data corresponding to the requested memory address in main memory and/or a higher level cache memory. The data contained in the data array at the index of the matching tag can be used for the memory access request, as opposed to having to access main memory or a higher level cache memory having greater memory access latency. If however, the memory address of the memory access request, or portion thereof, does not match a tag in the tag array, or if the cache entry is otherwise invalid, this is known as a "cache miss." In a cache miss, the data array is deemed not to contain data that can satisfy the memory access request.

For a cache hit, not only must a memory address, or portion thereof, of a memory access request match a tag in the tag array, the cache entry corresponding to the matched tag must also be valid. In this regard, a valid indicator (e.g., a valid bit) is provided for each cache entry in the cache memory to indicate the validity of the cache entry. Thus, the valid indicator is also consulted in a cache memory access as part of cache error logic. The valid indicator may be set to an invalid state when the data stored in the data array for the cache entry is no longer valid. The valid indicator also provides a convenient method for deleting a cache entry. To delete a cache entry, the valid indicator corresponding to the cache entry to be deleted can simply be set to an invalid state (e.g., a logical zero '0' value, where a logical one '1' value indicates a valid state), as opposed to overwriting the data stored in the data array for the cache entry. Thus, if a deleted cache entry is subsequently accessed before being filled with valid data, the valid indicator for the accessed cache entry will represent an invalid state for the cache entry. In this instance, the valid indicator will cause the cache memory to generate a cache miss for the cache entry access. However, if an unintentional bit flip occurs in the valid indicator thereby causing the valid indicator to improperly indicate a valid state for an invalid cache entry, such as from radiation or a power surge as examples, the cache memory will generate a false cache hit when accessing this invalid cache entry, as opposed to a true cache miss. As a result, invalid data may be provided from the cache memory for the memory access request as a result of the valid indicator bit flip.

Thus, it is desired in cache memory designs to account for the possibility of bit flips in valid indicators. One method to account for bit flips in the valid indicators in cache memory is to protect against bit flips from occurring. For example, the valid indicators can be radiation-hardened to make the valid indicators less susceptible to bit flips. However, radiation hardening may add cost or circuit complexity in a manner that decreases performance of cache memory.

An alternative method to protect against bit flips from occurring in valid indicators in cache memory is to detect bit flips in the valid indicators. One method of detecting bit flips in valid indicators is to duplicate the valid indicator in each cache entry in cache memory. The cache memory is designed to only generate a cache hit if both valid indicators for an accessed cache entry are valid. Thus, if a bit flip occurs in one of the valid indicators, the duplicate valid indicator will not match. However, duplicating valid indicators in cache entries in cache memory requires additional circuitry in the cache memory. Access latency to the cache memory and the energy consumed by the cache access may also be increased as a result of providing duplicated valid indicators for the additional logic required to determine if the valid indicators for an accessed cache entry match. Also, if the same bit flip occurs in duplicated valid indicators for a given cache entry, the valid indicators will still match and possibly generate a false cache hit.

Another method of detecting bit flips in valid indicators in cache memory is to include the valid indicators in a parity operation and parity check. Parity logic may be provided in cache memory to generate a parity (e.g., a parity bit or word) for a cache entry or portion thereof that includes a valid indicator for the cache entry on a fill of the cache entry. The parity is checked when a cache entry is accessed in the cache memory. If an unintended bit flip has occurred, the generated parity will not match the parity of the cache entry, or portion thereof, and a cache miss will be generated by the cache memory as a result. Thus, if the valid indicator of a cache entry is included in the generation of the parity, a bit flip in the valid indicator will result in a parity mismatch that will be used to generate a cache miss or to signal an error. However, providing a valid indicator as part of a parity indicator can be disadvantageous. If the valid indicator is included in the parity for the cache entry, the parity must be regenerated when a cache entry in the cache memory is changed. Thus, if a cache entry is deleted, the valid indicator cannot simply be set to an invalid state. A new parity indicator must also be generated and stored in the cache entry, thereby increasing latency and energy of a cache entry deletion operation. This performance penalty and increase in energy can be substantial if cache memory supports "flash invalidate" or "selective invalidate" operations that allow multiple cache entries in the cache memory to be invalidated simultaneously and quickly by simply invalidating the valid indicators. If the valid indicator of a cache memory is included in the parity for a cache entry, the parity for each invalidated cache entry must also be regenerated for each cache flash invalidate or selective invalidate operation.

SUMMARY OF THE DISCLOSURE

Aspects disclosed herein include cache memory error detection circuits for detecting bit flips in valid indicators (e.g., valid bits) in cache memory following invalidate operations. Related methods and processor-based systems are also disclosed. If a cache hit results from access to a cache entry (e.g., a tag) following an invalidate operation, but before the cache entry is re-established, a bit flip(s) has occurred in the valid indicator associated with the cache entry. This is because the valid indicator should indicate an invalid state (for a cache miss) as opposed to a valid state (for a cache hit) following the invalidate operation and prior to re-establishment of the cache entry. Thus, in aspects disclosed herein, when a valid indicator indicates a valid state for an accessed cache entry in cache memory, a cache memory error detection circuit is configured to determine if an invalidate operation was performed on the cache entry prior to re-establishment of the cache entry. If an invalidate operation was performed on the cache entry, a bit flip has occurred in the valid indicator because the valid indicator should indicate an invalid state, causing a cache miss to be generated. The valid indicator should indicate an invalid state, because the valid indicator is set to an invalid state following an invalidate operation. The cache memory error detection circuit can cause a cache miss to be generated or an error to be indicated for the accessed cache entry as a result, even though the valid indicator for the cache entry indicates a valid state due to the bit flip(s).

Thus, in aspects disclosed herein, for the cache memory error detection circuit to determine when an invalidate operation has occurred prior to re-establishment of the cache entry, an invalidate interval indicator (e.g., a counter) is provided. The invalidate interval indicator advances an invalidate interval state (e.g., a count) for each invalidate operation performed on a cache memory. The invalidate interval state, or encoded version thereof, is stored in the cache entry when the cache entry is established in the cache memory. If the valid indicator for a subsequently accessed cache entry indicates a valid state, the cache memory error detection circuit confirms that an invalidate operation has not occurred. If the invalidate interval state originally stored or encoded in the cache entry when the cache entry was established is not the current invalidate interval state when the valid indicator for an accessed cache entry indicates a valid state, this is an indication that a bit flip(s) has occurred in the valid indicator associated with the cache entry following an invalidate operation. This is because the valid indicator for the accessed cache entry should indicate an invalid state, as opposed to a valid state, following the invalidate operation, because the invalidate operation forced the valid indicator to an invalid state. Thus, in this example, the cache memory error detection circuit is configured to cause a cache miss (as opposed to a cache hit) or an error indication to be generated when a bit flip(s) is detected in a valid indicator associated with an accessed cache entry following the detected invalidate operation in order to avoid using data stored in a data array corresponding to the cache entry.

Because the invalidate interval state was stored or encoded in the cache entry in the cache memory when the cache entry was established, the cache memory error detection circuit can detect a bit flip(s) in valid indicators in the cache memory without protecting the valid indicators with radiation hardening, or including the valid indicators in a parity for the cache entry. If the valid indicators were included in the parity for the cache entry to detect valid indicator bit flips, the parity of each cache entry would have to be recalculated on a cache memory flash invalidate operation in addition to forcing the valid indicators to an invalid state, thus substantially increasing latency and energy of the flash invalidate operation. However, if the invalidate interval state is stored in each cache entry upon establishment, additional bits must be included for each cache entry in the cache memory. However, in other aspects disclosed herein, to avoid the need to include this additional storage in each cache entry in the cache memory to store the invalidate interval state when the cache entry is established, the invalidate interval state could alternatively be encoded with an existing cache entry parity stored in the cache entry. Thus in this latter example, only the overhead of the invalidate interval indicator and logic to encode and check the current invalidate interval state in the parity for the cache entry on cache entry establishment and access, respectively, would be required in the cache memory.

In this regard in one aspect, a cache memory error detection circuit for detecting bit flips in a valid indicator in cache memory is provided. The cache memory error detection circuit comprises at least one invalidate interval indicator configured to advance an invalidate interval state (e.g., increment a counter) based on an invalidate operation performed in a cache memory. The cache memory error detection circuit further comprises a redundant information indicator generation circuit configured to generate a redundant information indicator for each of an at least one cache entry based on the invalidate interval state, in response to establishment of the at least one cache entry in the cache memory. The cache memory error detection circuit also comprises at least one redundant information indicator validation circuit. The redundant information indicator validation circuit, in response to a valid indicator for an accessed cache entry in the cache memory indicating a valid state, is configured to receive the redundant information indicator for the accessed cache entry in the cache memory. The redundant information indicator validation circuit is also configured to receive the invalidate interval state from the at least one invalidate interval indicator and generate a current redundant information indicator based on the invalidate interval state. The redundant information indicator validation circuit is further configured to compare the redundant information indicator for the accessed cache entry to the current redundant information indicator and generate a cache entry error indicator. The cache entry error indicator can indicate if a bit flip occurred in the accessed cache entry based on the comparison of the redundant information indicator and the current redundant information indicator.

In another aspect, a cache memory error detection circuit for detecting bit flips in a valid indicator in cache memory is provided. The cache memory error detection circuit comprises a means for advancing an invalidate interval state based on an invalidate operation performed on a cache memory. The cache memory error detection circuit further comprises a means for generating a redundant information indicator for each of an at least one cache entry in the cache memory based on the invalidate interval state, in response to establishment of the at least one cache entry. The cache memory error detection circuit also comprises a means for, in response to a valid indicator for an accessed cache entry in the cache memory indicating a valid state, receiving the redundant information indicator for the accessed cache entry in the cache memory, receiving the invalidate interval state, generating a current redundant information indicator based on the invalidate interval state, and comparing the redundant information indicator for the accessed cache entry to the current redundant information indicator and generating a cache entry error indicator. The cache entry error indicator can indicate if a bit flip occurred in the accessed cache entry based on the comparison of the redundant information indicator and the current redundant information indicator.

In another aspect, a method of detecting cache memory errors from bit flips in a valid indicator in cache memory following invalidate operations is provided. The method comprises advancing an invalidate interval state of at least one invalidate interval indicator based on an invalidate operation performed on a cache memory and generating a redundant information indicator for each of an at least one cache entry in the cache memory, in response to establishing the at least one cache entry. The method further comprises receiving the redundant information indicator for an accessed cache entry in the cache memory and receiving the invalidate interval state from the at least one invalidate interval indicator. The method also comprises generating a current redundant information indicator based on the invalidate interval state, comparing the redundant information indicator for the accessed cache entry to the current redundant information indicator, and generating a cache entry error indicator. The method can also comprise generating a cache entry error indicator indicating if a bit flip occurred in the accessed cache entry based on the comparing of the redundant information indicator and the current redundant information indicator.

In another aspect, a non-transitory computer-readable medium having stored thereon computer executable instructions to cause a processor-based cache memory error detection circuit to detect bit flips in a valid indicator in cache memory is provided. The non-transitory computer-readable medium having stored thereon computer executable instructions causes the processor-based cache memory error detection circuit to advance an invalidate interval state of at least one invalidate interval indicator based on an invalidate operation performed on a cache memory, generate a redundant information indicator for each of an at least one cache entry in the cache memory, in response to establishing the at least one cache entry, receive the redundant information indicator for an accessed cache entry in the cache memory, receive the invalidate interval state from the at least one invalidate interval indicator, generate a current redundant information indicator based on the invalidate interval state, and compare the redundant information indicator for the accessed cache entry to the current redundant information indicator.

BRIEF DESCRIPTION OF THE FIGURES

FIG. 2 is a table illustrating a series of exemplary cache entry events in the cache memory in FIG. 1, which exemplifies the occurrence of a bit flip in a valid indicator for a cache entry after an invalidate operation is performed on the cache memory, and the ability of the cache memory error detection circuit in FIG. 1 to detect the bit flip of the valid indicator using an encoded redundant information indicator;

FIG. 7 is a table illustrating a series of exemplary cache entry events in the cache memory in FIG. 6, which exemplify the occurrence of a bit flip in the valid indicator for a cache entry after an invalidate operation is performed on the cache memory, and the ability of the cache memory error detection circuit in FIG. 6 to detect the bit flip of the valid indicator using an encoded redundant information indicator as part of an error detecting code of the accessed cache entry;

DETAILED DESCRIPTION

Aspects disclosed herein include cache memory error detection circuits for detecting bit flips in valid indicators (e.g., valid bits) in cache memory following invalidate operations. Related methods and processor-based systems are also disclosed. If a cache hit results from access to a cache entry (e.g., a tag) following an invalidate operation, but before the cache entry is re-established, a bit flip(s) has occurred in the valid indicator associated with the cache entry. This is because the valid indicator should indicate an invalid state (for a cache miss) as opposed to a valid state (for a cache hit) following the invalidate operation and prior to re-establishment of the cache entry. Thus, in aspects disclosed herein, when a valid indicator indicates a valid state for an accessed cache entry in cache memory, a cache memory error detection circuit is configured to determine if an invalidate operation was performed on the cache entry prior to re-establishment of the cache entry. If an invalidate operation was performed on the cache entry, a bit flip has occurred in the valid indicator because the valid indicator should indicate an invalid state, causing a cache miss to be generated or error to be indicated. The valid indicator should indicate an invalid state, because the valid indicator is set to an invalid state following an invalidate operation. The cache memory error detection circuit can cause a cache miss to be generated or an error to be indicated for the accessed cache entry as a result, even though the valid indicator for the cache entry indicates a valid state due to the bit flip(s).

Figure 1:
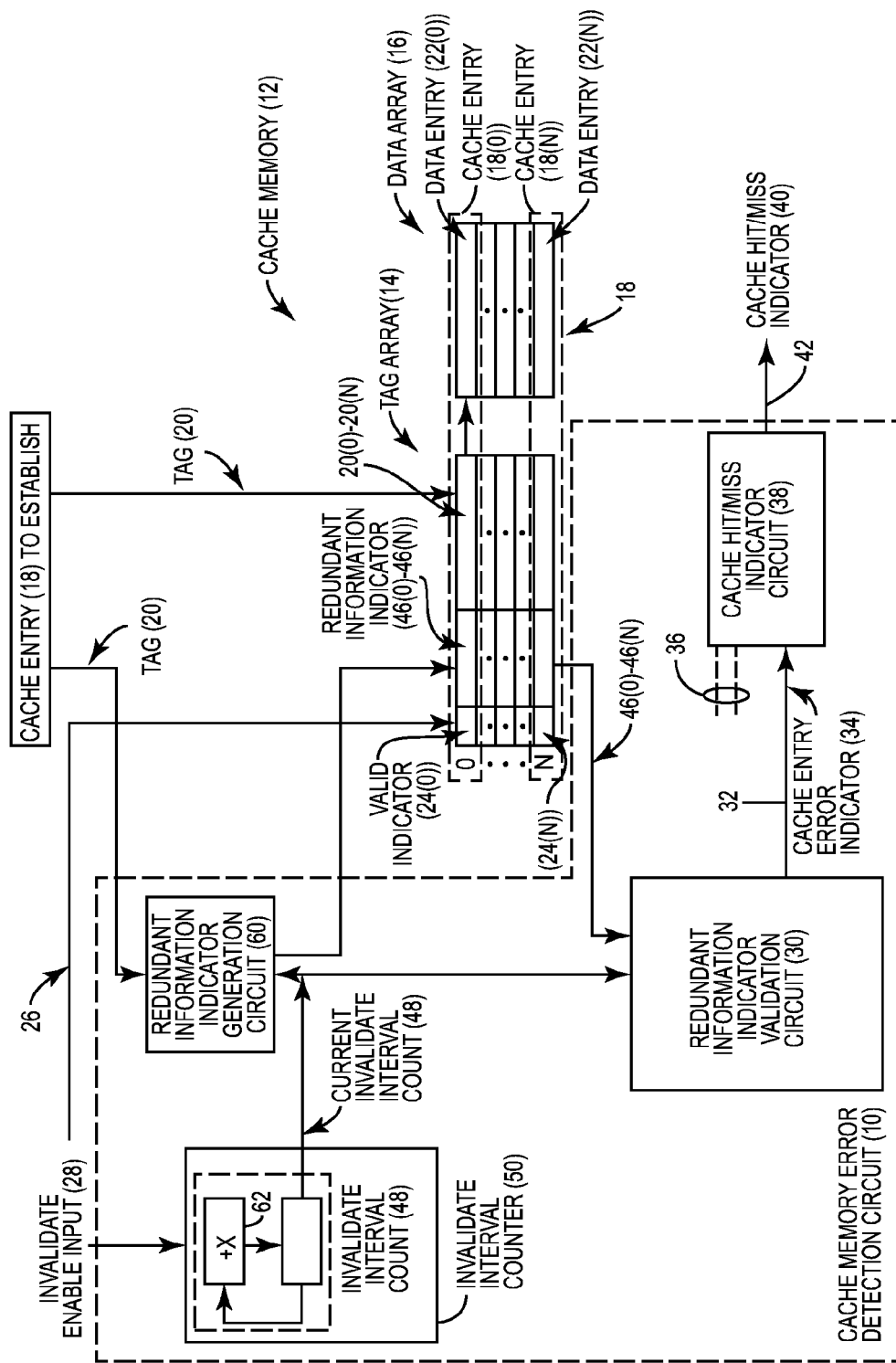
FIG. 1 is a schematic diagram of an exemplary cache memory error detection circuit provided in cache memory, wherein the cache memory error detection circuit is configured to detect bit flips in valid indicators in the cache memory following invalidate operations performed on the cache memory.

In this regard, FIG. 1 is a schematic diagram of an exemplary cache memory error detection circuit 10 provided in a cache memory 12. The cache memory 12 comprises a tag array 14 and a data array 16. The cache memory 12 can establish cache entries 18(0)-18(N) in the tag array 14 and the data array 16, wherein 'N+1' is the number of cache entries 18 in the cache memory 12. The cache entries 18(0)-18(N) are established by storing an associated tag 20(0)-20(N) in the tag array 14. Establishment of the cache entries 18(0)-18(N) also comprises storing corresponding data entries 22(0)-22(N) in the data array 16. The data entries 22(0)-22(N) may correspond to data stored in higher level memory, such as higher level cache memory or main memory. Upon establishment of a cache entry 18(0)-18(N), a valid indicator 24(0)-24(N) associated with each cache entry 18(0)-18(N) is set to a valid state (e.g., storing a logical high "1") indicating a validity of the cache entry 18(0)-18(N). If a cache entry 18(0)-18(N) is no longer valid, the corresponding valid indicator 24(0)-24(N) for the cache entry 18(0)-18(N) that is no longer valid can be changed to an invalid state (e.g., storing a logical low "0") to invalidate the cache entry 18(0)-18(N). The valid indicator 24(0)-24(N) can be used to determine whether a cache miss or other error should be generated for a respective cache entry 18(0)-18(N).

In continuing reference to FIG. 1, when it is desired to invalidate a cache entry 18 in the cache entries 18(0)-18(N), an invalidate operation can be performed on the cache entry 18 to be invalidated. One cache entry 18 can be invalidated in an invalidate operation, or an entire cache memory 12 or multiple cache entries 18(0)-18(N) thereof can be invalidated as part of a flash invalidate operation performed on the cache memory 12. An invalidate operation performed on one or more of the cache entries 18(0)-18(N) in the cache memory 12 in FIG. 1 is initiated upon receipt of an invalidate enable signal 26 received on an invalidate enable input 28. In response, the cache memory 12 sets the valid indicator 24(0)-24(N) associated with the invalidated cache entry 18(0)-18(N) to an invalid state. If a flash invalidate operation is performed on the cache memory 12 to invalidate all cache entries 18(0)-18(N), the cache memory 12 sets the state of all valid indicators 24(0)-24(N) corresponding to all cache entries 18(0)-18(N) to an invalid state.

With continuing reference to FIG. 1, if a valid indicator 24(0)-24(N) for a cache entry 18(0)-18(N) indicates a valid state following an invalidate operation, but prior to re-establishment of the cache entry 18(0)-18(N), it is known that a bit flip(s) has occurred in the valid indicator 24(0)-24(N) associated with the cache entry 18(0)-18(N). This is because the valid indicator 24(0)-24(N) should indicate an invalid state (for a cache miss) as opposed to a valid state (for a cache hit) following the invalidate operation prior to re-establishment of the cache entry 18(0)-18(N). Thus, when the valid indicator 24(0)-24(N) indicates a valid state for the accessed cache entry 18(0)-18(N) in the cache memory 12, as will be discussed in more detail below, a redundant information indicator validation circuit 30 provided in the cache memory error detection circuit 10 can determine if an invalidate operation was performed on the cache entry 18(0)-18(N) prior to re-establishment of the cache entry 18(0)-18(N). If an invalidate operation was performed on the cache entry 18(0)-18(N) prior to re-establishment of the cache entry 18(0)-18(N), the cache memory error detection circuit 10 in FIG. 1 can cause a cache miss to be generated or generate an error for the accessed cache entry 18(0)-18(N), even though the valid indicator 24(0)-24(N) for the cache entry 18(0)-18(N) indicates a valid state due to the bit flip(s) in the valid indicator 24(0)-24(N).

With continuing reference to FIG. 1, a cache entry error indicator 34 is provided on a cache entry error indicator line 32 to indicate if the accessed cache entry 18(0)-18(N) has incurred an error, such as a bit flip having occurred. As one example shown in FIG. 1, the cache entry error indicator 34 may be combined with other optional inputs 36 indicating cache memory errors (e.g., parity errors) as inputs to a cache hit/miss indicator circuit 38 to generate a cache hit/miss indicator 40 on a cache hit/miss indicator line 42 as a non-limiting example. As another example, the cache entry error indicator 34 could be provided to indicate an error in the valid indicator 24(0)-24(N) for the accessed cache entry 18(0)-18(N) separately from cache error generation and/or reporting. As yet another example, the cache entry error indicator 34 may be used to generate a forward error recovery using error correction codes (ECC) or a backward error recovery by resetting to a desired checkpoint.

Before discussing further exemplary details of the cache memory error detection circuit 10 in FIG. 1, FIG. 2 is first described herein to explain how the cache memory error detection circuit 10 in FIG. 1 can detect bit flips in the valid indicators 24(0)-24(N) following invalidate operations. In this regard, FIG. 2 illustrates a table 44 illustrating a series of exemplary events performed for a cache entry 18(0) in the cache memory 12 in FIG. 1. However, it should be noted that this example also applies to accessing cache entries 18(1)-18(N). The table 44 exemplifies the occurrence of a bit flip in the valid indicator 24(0) for the cache entry 18(0) following an invalidate operation, and the ability of the cache memory error detection circuit 10 in FIG. 1 to detect the bit flip.

In this regard, taking cache entry 18(0) in the cache memory 12 in FIG. 1 as an example, the cache entry 18(0) is shown as being established in the cache memory 12 by an establish event 52 in FIG. 2. The valid indicator 24(0) is set to a valid state (e.g., "1") during establishment of the cache entry 18(0). A current invalidate interval state in the form of an invalidate interval count 48 (e.g., "10") in this example is used as a redundant information indicator 46(0), which is stored in the cache entry 18(0) upon establishment. Thus, in this embodiment, the redundant information indicator 46(0) contains the actual, unencoded form of the invalidate interval count 48. The cache memory error detection circuit 10 detects the bit flip using the redundant information indicator 46(0)-46(N) corresponding to each cache entry 18(0)-18(N) and a current invalidate interval count 48 provided by an invalidate interval indicator in the form of an invalidate interval counter 50 in this example in the cache memory error detection circuit 10 in FIG. 1. The tag 20(0) is also established for the cache entry 18(0). Note that the invalidate interval indicator could be provided in other forms other than a counter to store any type of indicator desired without limitation, such as different states or other statuses as the invalidate interval state.

Next, with continuing reference to FIG. 2, an invalidate operation 54 is performed on the cache entry 18(0). The invalidate operation 54 sets the validity state of the valid indicator 24(0) for the cache entry 18(0) to an invalid state (e.g., "0") to invalidate the cache entry 18(0), as discussed above. The current invalidate interval count 48 is also advanced by being incremented in this example to record the invalidate operation 54. Note that while the current invalidate interval count 48 has been incremented, the redundant information indicator 46(0) in the cache entry 18(0) remains the same. This information is later used, as described below, to determine that the invalidate operation 54 occurred after the prior establish event 52 for the cache entry 18(0).

With continuing reference to FIG. 2, it is next assumed for illustration purposes that a radiation event 56 occurs that causes a bit flip to occur in the valid indicator 24(0) in this example (e.g., bit flip from "0" to "1"). However, as discussed above, the redundant information indicator 46(0) in the cache entry 18(0) is not equal to the current invalidate interval count 48, meaning that the invalidate operation 54 occurred where the valid indicator 24(0) is expected to contain an invalid state (e.g., '0'). Thus, when the cache entry 18(0) is subsequently accessed in an access event 58 before being re-established, the valid indicator 24(0) for the cache entry 18(0) indicates a valid state. However, as stated above, the cache entry 18(0) is not actually valid due to the previous invalidate operation 54. Because the current invalidate interval count 48 was incremented as a result of the invalidate operation 54, the current invalidate interval count 48 will not match the redundant information indicator 46(0) that was stored in the cache entry 18(0) when the cache entry 18(0) was established. Thus, the cache memory error detection circuit 10 can be configured to determine this mismatch as a method to detect that a bit flip occurred in the valid indicator 24(0) following the invalidate operation 54. As will be discussed in more detail below, the cache memory error detection circuit 10 can cause the access event 58 to the cache entry 18(0) to generate a cache miss or generate an error even though the valid indicator 24(0) indicates a valid state due to the bit flip to prevent a false cache hit from being generated.

In this regard, more exemplary detail of the cache memory error detection circuit 10 in FIG. 1 will now be discussed. In this regard, the redundant information indicator validation circuit 30 in the cache memory error detection circuit 10 in FIG. 1 determines when an invalidate operation (not shown) has occurred prior to re-establishment of the cache entry 18(0)-18(N), based on the invalidate interval counter 50. The invalidate interval counter 50 increments an invalidate interval count 48 for each invalidate operation performed on a cache entry 18(0)-18(N) in the cache memory 12 in this example. The invalidate interval count 48 is stored in the cache entry 18(0)-18(N) by a redundant information indicator generation circuit 60 as a redundant information indicator 46(0)-46(N) when the cache entry 18(0)-18(N) is established in the cache memory 12.

The invalidate interval counter 50 may be configured to increment the invalidate interval count 48 by one (1), or it may be desired to increment the invalidate interval count 48 by values other than one (1). The invalidate interval counter 50 may be configured to increment the invalidate interval count 48 over a range of invalidate interval count values based on the number of bits used by the invalidate interval counter 50. For example, if two (2) bits are used by the invalidate interval counter 50, there will be four (4) possible values for the invalidate interval count 48 (e.g., "00", "01", "10", and "11"); as described in FIG. 2, three (3) bits will provide for a range of eight (8) values. It may also be possible to configure the range of invalidate interval count values for the invalidate interval count 48 or even disable the invalidate interval counter 50 based on an invalidate interval configuration setting 62. The invalidate interval count 48 is provided by the invalidate interval counter 50 to the redundant information indicator generation circuit 60 and also to the redundant information indicator validation circuit 30.

With continuing reference to FIG. 1, if the valid indicator 24(0)-24(N) for a subsequently accessed cache entry 18(0)-18(N) indicates a valid state, the redundant information indicator validation circuit 30 in the cache memory error detection circuit 10 confirms if an invalidate operation has occurred since the last establishment of the accessed cache entry 18(0)-18(N). The redundant information indicator validation circuit 30 confirms if an invalidate operation has occurred based on the current invalidate interval count 48 and the invalidate interval count stored in the cache entry 18(0)-18(N) as the redundant information indicator 46(0)-46(N) when the cache entry 18(0)-18(N) was established. If the invalidate interval count stored in the cache entry 18(0)-18(N) when the cache entry 18(0)-18(N) was established does not match the current invalidate interval count 48 associated when the valid indicator 24(0)-24(N) for an accessed cache entry 18(0)-18(N), this results in a mismatch. This mismatch is an indication that a bit flip(s) has occurred in the valid indicator 24(0)-24(N) associated with the cache entry 18(0)-18(N) following an invalidate operation. This is because the valid indicator 24(0)-24(N) for the accessed cache entry 18(0)-18(N) should indicate an invalid state, as opposed to a valid state, following the invalidate operation, because the invalidate operation forced the valid indicator 24(0)-24(N) to an invalid state.

Thus, in this example in FIG. 1, the redundant information indicator validation circuit 30 in the cache memory error detection circuit 10 is configured to cause a cache miss (as opposed to a cache hit) to be generated or generate an error when a bit flip(s) is detected in a valid indicator 24(0)-24(N) associated with an accessed cache entry 18(0)-18(N). The current invalidate interval count 48 provided by the invalidate interval counter 50 not matching the redundant information indicator 46(0)-46(N) associated with the cache entry 18(0)-18(N) is an indication that a bit flip(s) has occurred in the valid indicator 24(0)-24(N) following the invalidate operation. The cache miss or other error is generated when a bit flip(s) is detected following the detected invalidate operation to avoid using the data entry 22(0)-22(N) stored in the data array 16 corresponding to the cache entry 18(0)-18(N). If the incorrect valid indicator 24(0)-24(N) state had not been detected for the accessed cache entry 18(0)-18(N), the cache memory 12 would have generated a false cache hit, as opposed to a true cache miss.

Figure 3:
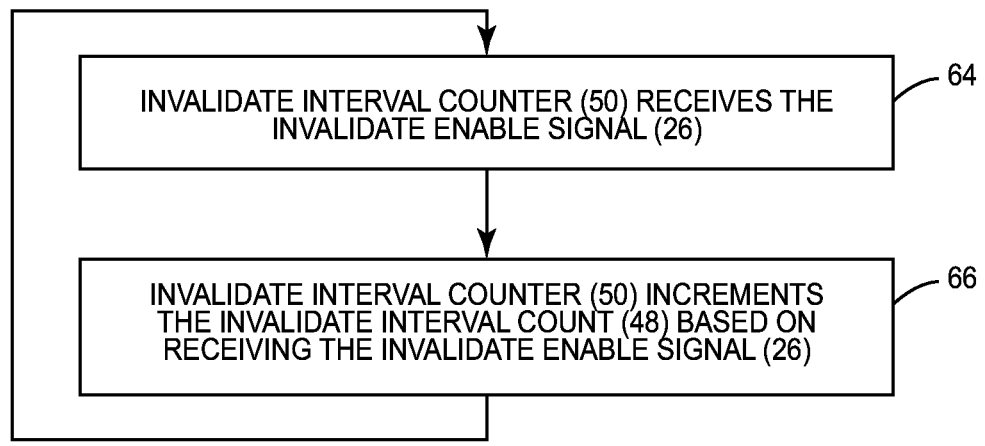
FIG. 3 is a flowchart illustrating an exemplary process for advancing an invalidate interval state in an invalidate interval indicator of the cache memory error detection circuit in FIG. 1 for each invalidate operation performed on the cache memory.

In this regard, FIG. 3 is a flowchart illustrating an exemplary process for incrementing the invalidate interval count 48 in the invalidate interval counter 50 of the cache memory error detection circuit 10 in FIG. 1 for each invalidate operation (not shown) performed on the cache entry 18(0)-18(N) in the cache memory 12. With reference to FIGS. 1 and 3, the invalidate interval counter 50 receives the invalidate enable signal 26 (block 64). The invalidate interval counter 50 then increments the invalidate interval count 48 based on receiving the invalidate enable signal 26 (block 66). The invalidate interval counter 50 may increment the invalidate interval count 48 by a configurable increment amount set by the invalidate interval configuration setting 62. The invalidate interval counter 50 may also be disabled or set to a fixed invalidate interval count 48 value based on the invalidate interval configuration setting 62.

Figure 4:
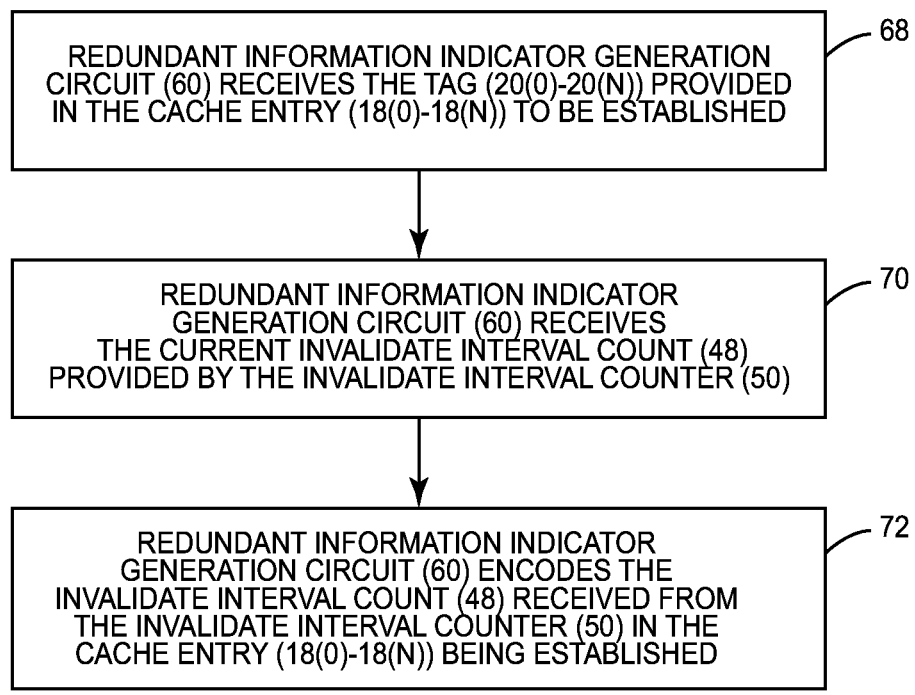
FIG. 4 is a flowchart illustrating an exemplary process of a redundant information indicator generation circuit in the cache memory error detection circuit in FIG. 1 receiving a current invalidate interval state from an invalidate interval indicator to be used to encode a redundant information indicator in a cache entry upon establishment in the cache memory.

In this regard, FIG. 4 is a flowchart illustrating an exemplary process of the redundant information indicator generation circuit 60 in the cache memory error detection circuit 10 in FIG. 1 receiving the current invalidate interval count 48 from the invalidate interval counter 50 to store a redundant information indicator 46(0)-46(N) in a cache entry 18(0)-18(N) upon establishment. With reference to FIGS. 1 and 4, the redundant information indicator generation circuit 60 is configured to receive the tag 20(0)-20(N) provided in the cache entry 18(0)-18(N) to be established (block 68). The redundant information indicator generation circuit 60 is also configured to receive the current invalidate interval count 48 provided by the invalidate interval counter 50 (block 70). The redundant information indicator generation circuit 60 stores the current invalidate interval count 48 received from the invalidate interval counter 50 in the cache entry 18(0)-18(N) being established (block 72). In this example, the redundant information indicator 46(0)-46(N) is the current invalidate interval count 48 and is stored in the cache entry 18(0)-18(N) as the redundant information indicator 46(0)-46(N). The redundant information indicator 46(0)-46(N) will be used by the redundant information indicator validation circuit 30 of the cache memory error detection circuit 10 to validate the valid indicator 24(0)-24(N) associated with the cache entry 18(0)-18(N).

Figure 5:
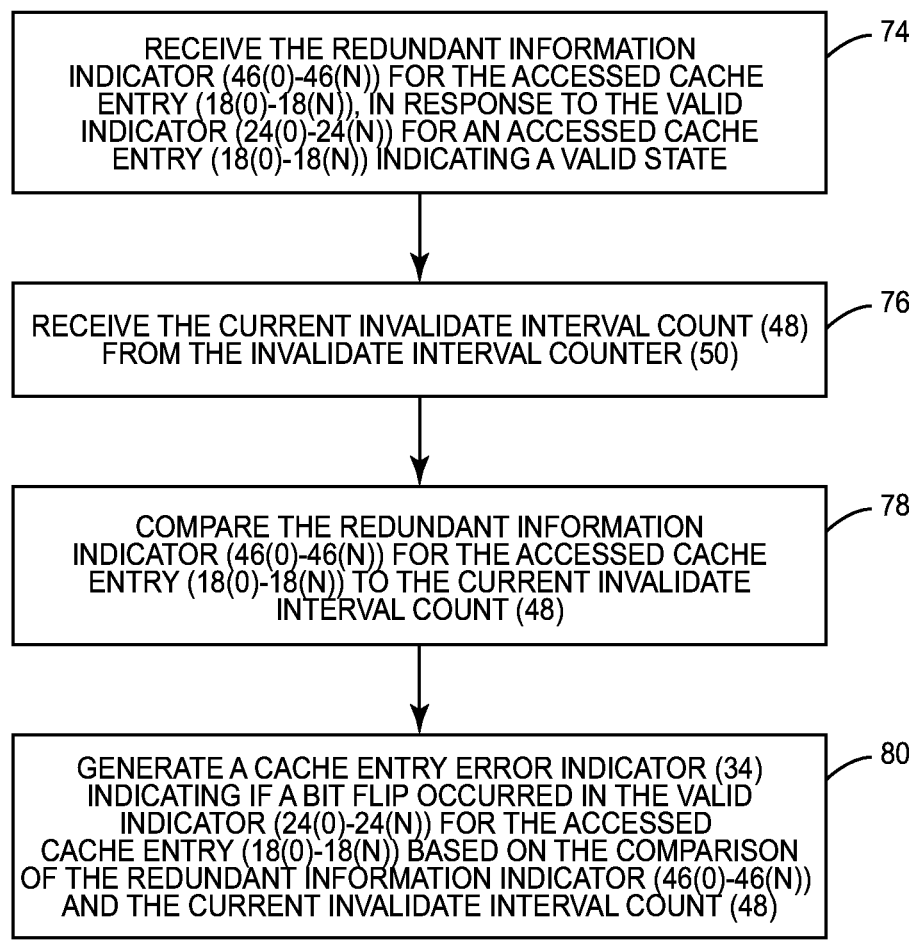
FIG. 5 is a flowchart illustrating an exemplary process of a redundant information indicator validation circuit in the cache memory error detection circuit in FIG. 1 detecting if a bit flip has occurred in a valid indicator of an accessed cache entry in the cache memory based on the redundant information indicator encoded with the accessed cache entry during establishment of the accessed cache entry and the current invalidate interval state in the invalidate interval indicator.

In this regard, FIG. 5 is a flowchart illustrating an exemplary process of the redundant information indicator validation circuit 30 in the cache memory error detection circuit 10 in FIG. 1 detecting if a bit flip has occurred in a valid indicator 24(0)-24(N) of an accessed cache entry 18(0)-18(N) in the cache memory 12. Detecting if a bit flip has occurred is based on comparing the redundant information indicator 46(0)-46(N) associated with the cache entry 18(0)-18(N) during establishment of the cache entry 18(0)-18(N) and the current invalidate interval count 48 in the invalidate interval counter 50. With reference to FIGS. 1 and 5, the redundant information indicator validation circuit 30 validates the valid indicator 24(0)-24(N) corresponding to the cache entry 18(0)-18(N) being accessed based on the redundant information indicator 46(0)-46(N) stored in the cache entry 18(0)-18(N). The redundant information indicator validation circuit 30 receives the redundant information indicator 46(0)-46(N) for the accessed cache entry 18(0)-18(N) in response to the valid indicator 24(0)-24(N) for an accessed cache entry 18(0)-18(N) indicating a valid state (block 74). The redundant information indicator validation circuit 30 also receives the current invalidate interval count 48 from the invalidate interval counter 50 (block 76). The redundant information indicator validation circuit 30 compares the redundant information indicator 46(0)-46(N) associated with the accessed cache entry 18(0)-18(N) to the current invalidate interval count 48 (block 78). If the current invalidate interval count 48 does not match the invalidate interval count stored in the redundant information indicator 46(0)-46(N) at the time when the valid indicator 24(0)-24(N) for an accessed cache entry 18(0)-18(N) indicated a valid state, this is an indication that a bit flip(s) has occurred in the valid indicator 24(0)-24(N) associated with the cache entry 18(0)-18(N) following an invalidate operation. This is because the valid indicator 24(0)-24(N) for the accessed cache entry 18(0)-18(N) should indicate an invalid state, as opposed to a valid state, following the invalidate operation because the invalidate operation forces the valid indicator 24(0)-24(N) to an invalid state. A match will indicate that both establishment of the cache entry 18(0)-18(N) and access of the established cache entry 18(0)-18(N) have occurred in the same invalidate interval. The cache entry error indicator 34 indicates whether a bit flip has occurred in the valid indicator 24(0)-24(N) for the accessed cache entry 18(0)-18(N) in this aspect based on comparing of the redundant information indicator 46(0)-46(N) and the current invalidate interval count 48 (block 80).

The cache memory error detection circuit 10 in FIG. 1 can detect a bit flip(s) in the valid indicators 24(0)-24(N) in the cache memory 12 without protecting the valid indicators 24(0)-24(N) with radiation hardening, or including the valid indicators 24(0)-24(N) in an error detecting code, such as a parity, for the cache entry 18(0)-18(N). The cache memory error detection circuit 10 can detect a bit flip(s) by the invalidate interval count 48 being stored in the cache entry 18(0)-18(N) in the cache memory 12 when the cache entry 18(0)-18(N) is established. If the valid indicator 24(0)-24(N) was included in an error detecting code for the cache entry 18(0)-18(N), the error detecting code of each invalidated cache entry 18(0)-18(N) would have to be recalculated on a cache memory flash invalidate operation in addition to forcing the valid indicators 24(0)-24(N) to an invalid state, thus increasing latency of the flash invalidate operation. However, if the invalidate interval count 48 is stored in each cache entry 18(0)-18(N) upon establishment, additional bits must be included for each cache entry 18(0)-18(N) in the cache memory 12. To avoid the need to provide additional bits in each cache entry 18(0)-18(N) in the cache memory 12 to store the invalidate interval count 48 when the cache entry 18(0)-18(N) is established, the invalidate interval count 48 could alternatively be encoded with an existing cache entry error detecting code (e.g., parity) stored in the cache entry 18(0)-18(N).

Figure 6:
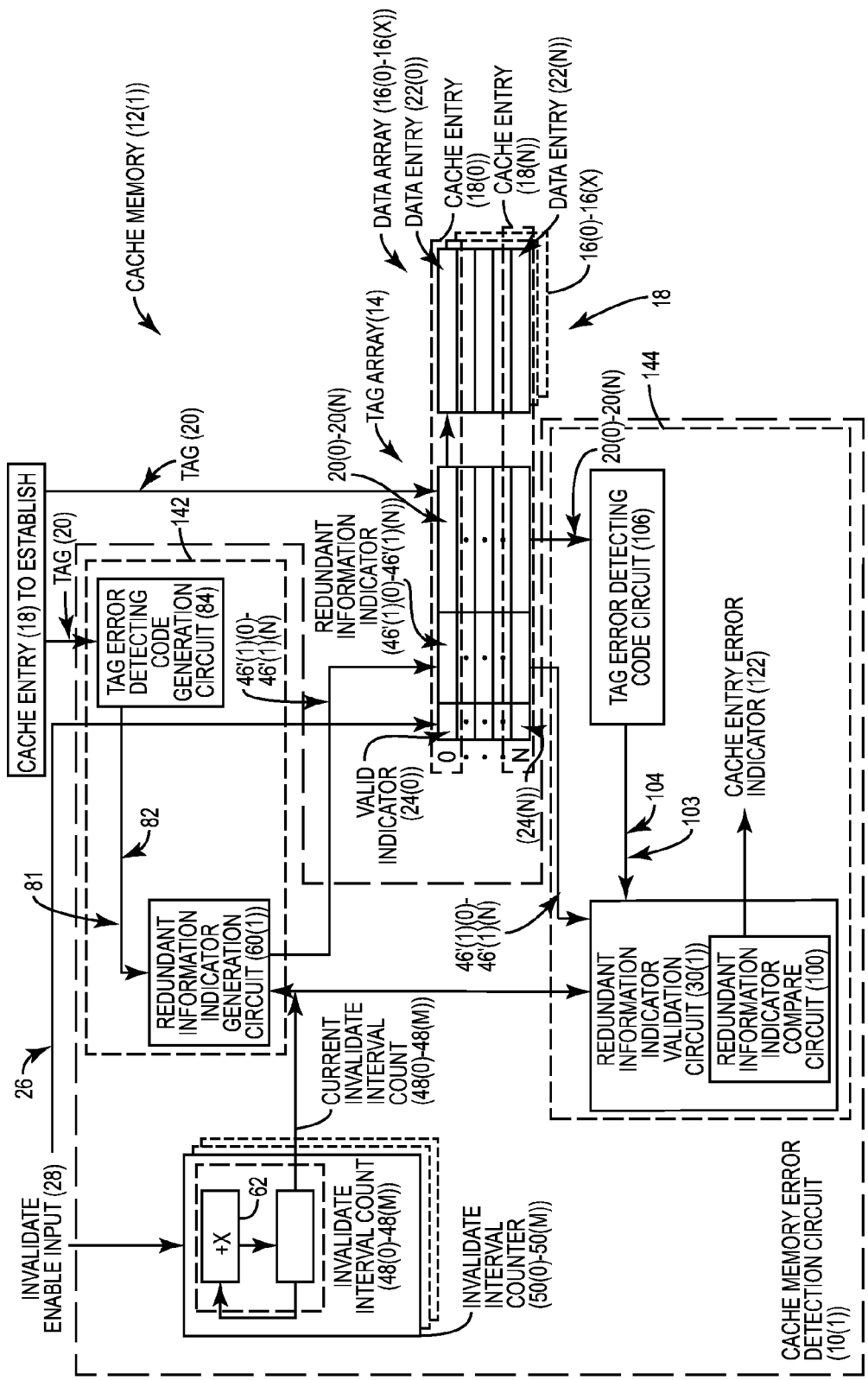
FIG. 6 is a schematic diagram of another exemplary cache memory error detection circuit provided in cache memory, wherein the cache memory error detection circuit is configured to detect bit flips in valid indicators in the cache memory following invalidate operations performed on the cache memory, wherein an invalidate interval indicator is encoded in an error detecting code (e.g., parity) corresponding to an accessed cache entry.

In this regard to FIG. 6, a schematic diagram of an exemplary cache memory error detection circuit 10(1) providing cache entry error detection similar to FIG. 1 is provided. The cache memory error detection circuit 10(1) in FIG. 6 includes some common elements with the cache memory error detection circuit 10 FIG. 1, which share common element numbers. Thus, these common elements will not be re-described here. The cache memory error detection circuit 10(1) in FIG. 6 also provides a function of detecting a bit flip(s) in the cache entry 18(0)-18(N). The cache memory error detection circuit 10(1) is comprised of at least one invalidate interval counter 50(0)-50(M), previously described in FIG. 1. The cache memory error detection circuit 10(1) provides the invalidate interval count 48(0)-48(M) to both a redundant information indicator generation circuit 60(1) and also to a redundant information indicator validation circuit 30(1).

With continuing reference to FIG. 6, a plurality of invalidate interval counters 50(0)-50(M) may be provided that include associated invalidate interval counts 48(0)-48(M) to facilitate tracking selective invalidate operations. A selective invalidate operation is an invalidate operation performed on only a portion of the cache entries 18(0)-18(N), which may or may not be contiguous, in the cache memory 12(1), as opposed to a flash invalidate operation performed on all or a subset of all the cache entries 18(0)-18(N) in the cache memory 12(1). A selective invalidate operation allows for a subset of the cache entries 18(0)-18(N), which may or may not be contiguous, to be associated with a particular invalidate interval counter 50(0)-50(M) and the corresponding invalidate interval count 48(0)-48(M). A selective invalidate operation may be determined based on, but not limited to, privilege, security, exception level, different modes of operation, type of entries, etc. In this manner, the cache memory error detection circuit 10(1) in FIG. 6 may be configured to increment the invalidate interval count 48(0)-48(M) associated with only a portion of the cache entries 18(0)-18(N) in response to the invalidate enable signal 26.

With continued reference to FIG. 6, the cache memory 12(1) includes a plurality of data arrays 16(0)-16(X) in this example, wherein the number of data arrays 16 is equal to "X+1." Each of the plurality of data arrays 16(0)-16(X) is associated with the invalidate interval counters 50(0)-50(M). The data arrays 16(0)-16(X) also share common invalidate interval counters 50(0)-50(M) if the plurality of data arrays 16(0)-16(X) are using a common list of events that invalidate operations may be based on, such as, privilege, security, exception level, different modes of operation, type of entries, etc. A plurality of cache memories (not shown) may each provide the redundant information indicator generation circuit 60(1) and the redundant information indicator validation circuit 30(1). For example, a plurality of cache levels provided by the plurality of cache memories (not shown) may invalidate together, thus eliminating the need for an invalidate interval counter 50(0)-50(M) for each cache memory 12(1) or each level of the cache memory 12(1).

With continued reference to FIG. 6, the redundant information indicator generation circuit 60(1) receives the current invalidate interval count 48(0)-48(M) provided by the invalidate interval counter 50(0)-50(M) associated with the cache entry 18(0)-18(N) being accessed. In addition, the redundant information indicator generation circuit 60(1) receives an error detecting code 81 in the form of a tag parity 82, as a non-limiting example, as a second input provided by a tag error detecting code generation circuit 84. The tag error detecting code generation circuit 84 generates the tag parity 82 based on the tag 20(0)-20(N) received in the cache entry 18(0)-18(N). The tag parity 82 is used for error checking purposes allowing the cache memory 12(1) to detect if the tag 20(0)-20(N) has been corrupted or has otherwise changed unexpectedly. In this example, the redundant information indicator generation circuit 60(1) receives the tag parity 82 and encodes the received invalidate interval count 48(0)-48(M) to provide an encoded version of the received invalidate interval count 48(0)-48(M) as part of the tag parity 82. As a result of this encoding, the redundant information indicator generation circuit 60(1) outputs an encoded version of the redundant information indicator 46'(1)(0)-46'(1)(N) to be stored corresponding to the cache entry 18(0)-18(N) to be established.

Encoding the invalidate interval count 48(0)-48(M) in the tag parity 82 allows for the benefit of encoding the invalidate interval count 48(0)-48(M) without the need for additional bits for parity storage. This form of encoding also provides the benefit of combining the valid indicator 24(0)-24(N) and tag 20(0)-20(N) error detecting code (e.g., parity) checks into a single operation in the redundant information indicator validation circuit 30(1). The stored encoded redundant information indicator 46'(1)(0)-46'(1)(N) is then used to validate the valid indicator 24(0)-24(N) corresponding to the cache entry 18(0)-18(N) subsequently accessed. However, as discussed in more detail below, if a bit flip is detected in the cache entry 18(0)-18(N) in the cache memory 12(1) in FIG. 6, the bit flip may have occurred anywhere in the cache entry 18(0)-18(N), as opposed to only in the valid indicator 24(0)-24(N). To further explain the cache memory 12(1) in FIG. 6, FIG. 7 provides a table 86 illustrating a series of exemplary cache entry 18(0) events in the cache memory 12(1) in FIG. 6. As an example, the table 86 exemplifies the occurrence of a bit flip in the valid indicator 24(0) after an invalidate operation and the ability to detect a bit flip in the cache entry 18(0)-18(N) using the encoded redundant information indicator 46'(1)(0) and the current invalidate interval count 48(0). With reference to FIG. 7, the illustrated exemplary events are comprised of a series of cache entry 18(0) events. The cache entry 18(0) is initially established in an establish event 90. Upon the cache entry 18(0) establish event 90, the tag 20(0) is stored in the tag array 14. In addition, the valid indicator 24(0) is set to a valid state (e.g., logical high or "1") by the cache memory 12(1). The redundant information indicator 46(1)(0) in this example is encoded by the redundant information indicator generation circuit 60(1) with the current invalidate interval count 48(0) (e.g., "10") to provide the encoded redundant information indicator 46'(1)(0) stored in the cache entry 18(0) in the tag array 14. In this example, the redundant information indicator generation circuit 60(1) encodes the current invalidate interval count 48(0) (e.g., "10") with the tag 20(0) (e.g., "0111") using an "exclusive or" function, resulting in a value of "00" stored corresponding to the cache entry 18(0). At some point in time, an invalidate operation 92, indicated by the received invalidate enable signal 26 (not shown), invalidates at least one cache entry 18(0). When the invalidate operation 92 occurs, the cache memory 12(1) will set the valid indicator 24(0) to an invalid state (e.g., logical low or "0"). In addition, in response to receiving the invalidate enable signal 26 indicating the invalidate operation 92, the current invalidate interval count 48(0) is incremented by a configured interval by the invalidate interval counter 50(0) (e.g., "11"). However, while the current invalidate interval count 48(0) is incremented, the stored encoded redundant information indicator 46'(1)(0) with the encoded invalidate interval count 48(0) remains unchanged.

With continued reference to FIG. 7, the cache memory error detection circuit 10(1) is configured to detect bit flips in a cache entry 18(0)-18(N) following the invalidate operation 92. If the valid indicator 24(0) for a subsequently accessed cache entry 18(0) indicates a valid state, the cache memory error detection circuit 10(1) confirms that an encoded version of the current invalidate interval count 48(0) provided by the invalidate interval counter 50(0) matches the redundant information indicator 46(1)(0) when the cache entry 18(0) was established. The current invalidate interval count 48(0) is encoded in the same manner as was the redundant information indicator 46(1)(0). Thus, the current invalidate interval count 48(0) matching the stored redundant information indicator 46(1)(0) means the same invalidate interval count 48(0) was used to establish and access the cache entry 18(0). Thus, the invalidate operation 92 was not performed prior to the access to the cache entry 18(0). If, however, upon an access event 96 to the cache entry 18(0), an encoded version of the current invalidate interval count 48(0) does not match the invalidate interval count 48(0) associated with the cache entry 18(0), this is an indication that a bit flip(s) has occurred in the accessed cache entry 18(0) following the invalidate operation 92 even though the valid indicator 24(0) for the accessed cache entry 18(0) indicates a valid state. In this manner, the cache memory 12(1) may generate a false cache hit as opposed to a true cache miss.

Figure 8:
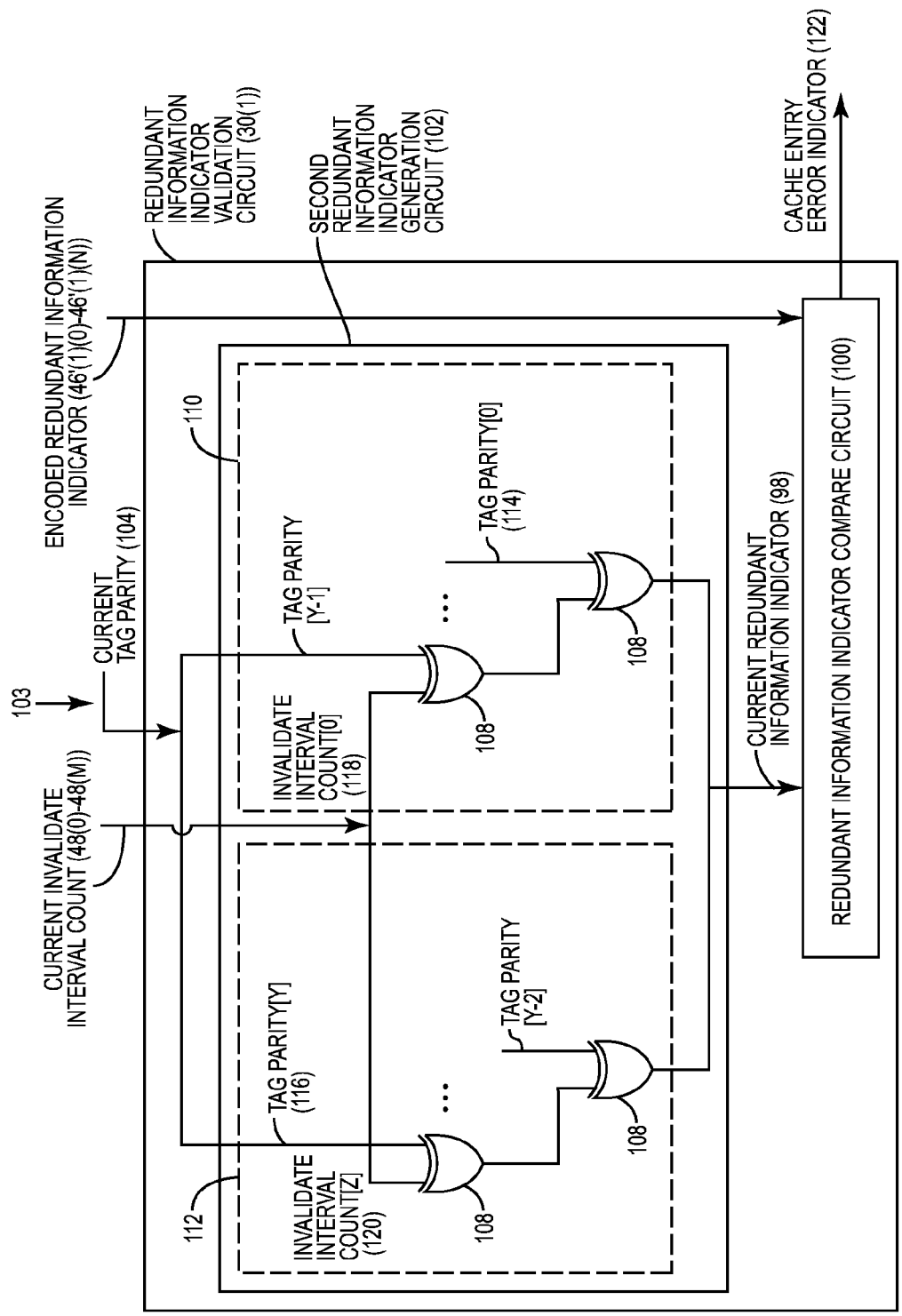
FIG. 8 is a schematic diagram of an exemplary redundant information indicator validation circuit that can be provided in the cache memory error detection circuit in FIG. 6, wherein the redundant information indicator validation circuit is configured to detect a bit flip in the valid indicator of an accessed cache entry based on an associated redundant information indicator encoded with the invalidate interval state from the invalidate interval indicator upon establishment of the cache entry in the cache memory.

FIG. 8 provides additional detail of a schematic diagram of an exemplary redundant information indicator validation circuit 30(1) that can be provided in the cache memory error detection circuit 10(1) in the cache memory 12(1) in FIG. 6 to detect bit flips in the cache entries 18(0)-18(N). The redundant information indicator validation circuit 30(1) is configured to detect a bit flip in the cache entry 18(0)-18(N) based on a stored encoded redundant information indicator 46'(1)(0)-46'(1)(N) encoded with the invalidate interval count 48(0)-48(M) from the invalidate interval counter 50(0)-50(M) at the time of the cache entry 18(0)-18(N) establishment. Referring to FIG. 8, the redundant information indicator validation circuit 30(1) is configured to compare the stored encoded redundant information indicator 46'(1)(0)-46'(1)(N) to a current redundant information indicator 98 to determine the valid indicator 24(0)-24(N) as properly valid. The generation of the current redundant information indicator 98 is discussed below. A redundant information indicator compare circuit 100 is provided to compare the encoded redundant information indicator 46'(1)(0)-46'(1)(N), encoded at the time of the cache entry 18(0)-18(N) establishment, to the current redundant information indicator 98 generated at the time of the cache entry 18(0)-18(N) access. By comparing the encoded redundant information indicators 46'(1)(0)-46'(1)(N) and the current redundant information indicator 98, the redundant information indicator validation circuit 30(1) is able to determine if an invalidate operation has occurred subsequent to the cache entry 18(0)-18(N) establishment and prior to the cache entry 18(0)-18(N) access. If the encoded redundant information indicators 46'(1)(0)-46'(1)(N) and the current redundant information indicator 98 are not equal, then this is an indication that an invalidate operation has occurred following the establishment of the cache entry 18(0)-18(N) and the associated valid indicator 24(0)-24(N) should be set to an invalid state.

With continued reference to FIG. 8, the current redundant information indicator 98 is generated by a second redundant information indicator generation circuit 102 provided in the redundant information indicator validation circuit 30(1). The second redundant information indicator generation circuit 102 receives a current generated error detecting code 103 in the form of a tag parity 104 as a non-limiting example provided by a tag error detecting code circuit 106 in FIG. 6. The second redundant information indicator generation circuit 102 also receives the current invalidate interval count 48(0)-48(M) provided by the invalidate interval counter 50(0)-50(M). The invalidate interval count 48(0)-48(M) represents the current invalidate interval count 48(0)-48(M) at the time of cache entry 18(0)-18(N) access. The current redundant information indicator 98 is generated by the second redundant information indicator generation circuit 102 in a similar fashion to the encoded redundant information indicator 46'(1)(0)-46'(1)(N).

With continued reference to FIG. 8, the second redundant information indicator generation circuit 102 uses a plurality of logic gates 108 that implement an OR-based function to generate the current redundant information indicator 98. For example, the logic gates 108 are XOR gates in this example, but other gates, including OR-based gates such as OR and/or NOR gates may also be employed as examples. As a non-limiting example, if the invalidate interval count 48(0)-48(M) is "10" and the tag 20(0)-20(N) is "0111," a first parity generation circuit 110 performs an "exclusive or" function on the odd bits of the combined or concatenated value of "10"+"0111" or "100111." The first two (2) bits of the combined or concatenated value "100111" are the invalidate interval count 48(0)-48(M) and the second four (4) bits are the tag 20(0)-20(N) in the cache entry 18(0)-18(N). The results of the "exclusive or" function on the odd bits of the combined or concatenated value "100111" is "0," which becomes the first bit of the encoded redundant information indicator 46'(1)(0)-46'(1)(N). In a second parity generation circuit 112, the even bits of the tag parity 104 and the even bits of the invalidate interval count 48(0)-48(M) are encoded using the same "exclusive or" function applied to each of the even bits. The result forms a second bit of the encoded redundant information indicator 46'(1)(0)-46'(1)(N). The resulting encoded redundant information indicator 46'(1)(0)-46'(1)(N) becomes the tag parity 104 encoded with the invalidate interval count 48(0)-48(M) via an applied "exclusive or" function to each of the odd and even bits. It should be noted that other digital logic functions, besides an "exclusive or" function, may be used.

With continued reference to FIGS. 6 and 8, the redundant information indicator validation circuit 30(1) may be configured to receive a plurality of bits representing the tag parity 104, such that tag parity[0] 114 represents the first or least significant bit and tag parity[Y] 116 represents the last or most significant bit, where there are Y bits in the tag parity 104. The redundant information indicator validation circuit 30(1) may also be configured to receive a plurality of bits representing the invalidate interval count 48(0)-48(M), such that invalidate interval count[0] 118 represents the first or least significant bit and invalidate interval count[Z] 120 represents the last or most significant bit, where there are Z bits in the invalidate interval count 48(0)-48(M). The resulting encoded redundant information indicator 46'(1)(0)-46'(1)(N) is stored in the tag array 14 corresponding to the cache entry 18(0)-18(N).

Once generated, the current redundant information indicator 98 is compared to the stored encoded redundant information indicator 46'(1)(0)-46'(1)(N) by the redundant information indicator compare circuit 100 to determine whether a match exists. If a match exists, this is an indication that the valid indicator 24(0)-24(N) should be valid since the cache entry 18(0)-18(N) establishment and the cache entry 18(0)-18(N) access have occurred in the same invalidate interval as represented by the same invalidate interval count 48(0)-48(M). As a result of the comparison, the redundant information indicator compare circuit 100 generates a cache entry error indicator 122 that signals whether a bit flip(s) has occurred in the cache entry 18(0)-18(N).

Figure 9:
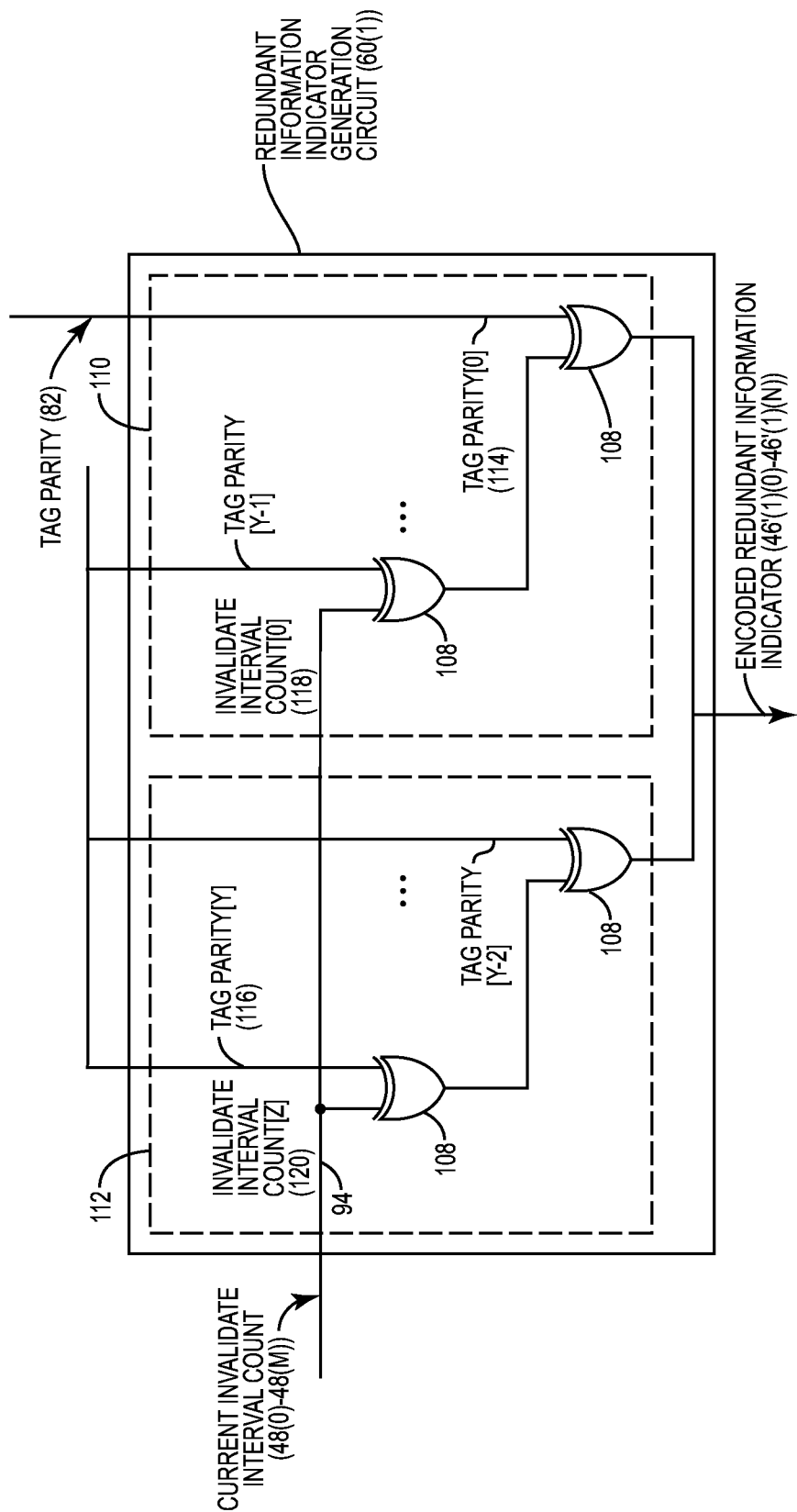
FIG. 9 is a schematic diagram of an exemplary redundant information indicator generation circuit that can be provided in the cache memory error detection circuit in FIG. 6, wherein the redundant information indicator generation circuit is configured to generate the redundant information indicator based on an encoded error detecting code corresponding to the accessed cache entry to be established and the invalidate interval state from the invalidate interval indicator at establishment of the accessed cache entry.

With continued reference to FIG. 6, additional detail of a schematic diagram of an exemplary redundant information indicator generation circuit 60(1) in the cache memory 12(1) is provided in FIG. 9. The redundant information indicator generation circuit 60(1) is configured to generate the encoded redundant information indicator 46'(1)(0)-46'(1)(N) based on the encoded error detecting code (e.g., parity) corresponding to the cache entry 18(0)-18(N) to be established and the invalidate interval count 48(0)-48(M) at the time the cache entry 18(0)-18(N) is established. Referring to the redundant information indicator generation circuit 60(1) in FIG. 9, one method of encoding the invalidate interval count 48(0)-48(M) with the tag parity 82 to generate the encoded redundant information indicator 46'(1)(0)-46'(1)(N) is illustrated. In this example, the redundant information indicator generation circuit 60(1) uses the plurality of logic gates 108 that implement an "exclusive or" function for encoding the invalidate interval count 48(0)-48(M) in the tag parity 82. The redundant information indicator generation circuit 60(1) is similar to the redundant information indicator validation circuit 30(1). The "exclusive or" function can be used to implement parity generation as an error detecting code in digital circuits. In this example, the redundant information indicator generation circuit 60(1) will generate the encoded redundant information indicator 46'(1)(0)-46'(1)(N) based on applying an "exclusive or" to each of the odd and even bits of the received inputs. In the first parity generation circuit 110, the odd bits of the tag parity 82 and the odd bits of the invalidate interval count

48(0)-48(M) are encoded using an "exclusive or" function applied to each of the odd bits. The result forms a first bit of the encoded redundant information indicator 46'(1)(0)-46'(1)(N).

With continued reference to FIG. 9 in conjunction with FIG. 6, as a non-limiting example, if the invalidate interval count 48(0)-48(M) is "10" and the tag 20(0)-20(N) is "0111," the first parity generation circuit 110 performs an "exclusive or" function on the odd bits of the combined or concatenated value of "10"+"0111" or "100111." The first two (2) bits of the combined or concatenated value "100111" are the invalidate interval count 48(0)-48(M) and the second four (4) bits are the tag 20(0)-20(N) in the cache entry 18(0)-18(N). The results of the "exclusive or" function on the odd bits of the combined or concatenated value "100111" is "0," which becomes the first bit of the encoded redundant information indicator 46'(1)(0)-46'(1)(N). In the second parity generation circuit 112, the even bits of the tag parity 82 and the even bits of the invalidate interval count 48(0)-48(M) are encoded using the same "exclusive or" function applied to each of the even bits. The result forms a second bit of the encoded redundant information indicator 46'(1)(0)-46'(1)(N). The resulting encoded redundant information indicator 46'(1)(0)-46'(1)(N) becomes the tag parity 82 encoded with the invalidate interval count 48(0)-48(M) via an applied "exclusive or" function to each of the odd and even bits. It should be noted that other digital logic functions, besides an "exclusive or" function, may be used.

With continued reference to FIGS. 6 and 9, the redundant information indicator generation circuit 60(1) may be configured to receive a plurality of bits representing the tag parity 82, such that tag parity[0] 114 represents the first or least significant bit and tag parity[Y] 116 represents the last or most significant bit, where there are Y bits in the tag parity 82. The redundant information indicator generation circuit 60(1) may also be configured to receive a plurality of bits representing the invalidate interval count 48(0)-48(M), such that invalidate interval count[0] 118 represents the first or least significant bit and invalidate interval count[Z] 120 represents the last or most significant bit, where there are Z bits in the invalidate interval count 48(0)-48(M). The resulting encoded redundant information indicator 46'(1)(0)-46'(1)(N) is stored in the tag array 14 corresponding to the cache entry 18(0)-18(N).

With continued reference to FIG. 6, the redundant information indicator validation circuit 30(1) is configured to receive the current invalidate interval count 48(0)-48(M) in response to the cache entry 18(0)-18(N) being accessed. The redundant information indicator validation circuit 30(1) is also configured to receive the encoded redundant information indicator 46'(1)(0)-46'(1)(N) stored corresponding to the cache entry 18(0)-18(N) accessed. Additionally, the redundant information indicator validation circuit 30(1) is configured to receive a current generated tag parity 104 from the tag parity circuit 106. The current generated tag parity 104 is generated in a similar fashion to the tag parity 82 generated from the tag parity generation circuit 84 discussed above. The tag parity circuit 106 generates the current generated tag parity 104 using logic gates (not shown) provided in the tag parity circuit 106. However, in this example, checking the tag parity 104 is not performed in the tag parity circuit 106. In this example, the tag parity 104 is checked in the redundant information indicator validation circuit 30(1). While the tag parity 104 is still checked, it is now performed on both the tag 20(0)-20(N) and the valid indicator 24(0)-24(N), even though the same number of bits for the encoded redundant information indicator 46'(1)(0)-46'(1)(N) are still used. The same number of bits for the encoded redundant information indicator 46'(1)(0)-46'(1)(N) are used as the number that would be used in the scenario where only the tag parity 104 check for the tag 20(0)-20(N) is performed. In this manner, encoded redundant information indicator 46'(1)(0)-46'(1)(N) provides error detecting code (e.g., parity) protection for both the valid indicator 24(0)-24(N) and also the tag 20(0)-20(N). Additionally, the invalidate interval counter 50(0)-50(M) can also be used by other cache memories (not shown) to track invalidate operations.

As one non-limiting example, the number of bits provided in each invalidate interval count 48(0)-48(M) in the cache memory error detection circuit 10(1) in FIG. 6 may be provided to be less than or equal to the number of bits in the tag parity 82. Otherwise, it may not be possible for the redundant information indicator validation circuit 30(1) in FIG. 8 to detect bit flips in all scenarios. For example, assume there are four (4) counter bits provided in an invalidate interval count 48 and two (2) parity bits in the current tag parity 104. Also assume counter values of '0111' and '1000' as invalidate interval counts 48. When the even and odd bits of these invalidate interval counts of '0111' and '1000' are considered, both result in the same "even" result of =1 XOR 1=0 XOR 0=0 being generated by the redundant information indicator generation circuit 60(1) in FIG. 9. Both also result in the same "odd" result=0 XOR 1=1 XOR 0=1 being generated by the redundant information indicator generation circuit 60(1) in FIG. 9. Therefore, when the invalidate interval count 48 is incremented from '0111' to '1000' due to an invalidate operation, the redundant information indicator generation circuit 60(1) encodes the same value in an encoded redundant information indicator 46' for both invalidate interval counts of '0111' and '1000' as the new invalidate interval count 48. Thus, it would not be possible in this example for the redundant information indicator validation circuit 30(1) in FIG. 8 to detect a bit flip after a corresponding invalidate operation that increments the invalidate interval count 48 from '0111' to '1000,' since the encoding results of the redundant information indicator 46 provided by the redundant information indicator generation circuit 60(1) would be the same in this instance.

Note that it is also possible that when establishing the cache entries 18(0)-18(N), the redundant information indicator 46(1)(0)-46(1)(N) may be encoded with an invalidate interval count to provide an encoded redundant information indicator 46' different from the current invalidate interval count 48(0)-48(M). This technique may be used for other operations performed on the cache memory 12(1) that are not flash invalidates. For example, it may be desired to target a particular cache entry 18(0)-18(N) to invalidate. In this example, the valid indicator 24(0)-24(N) for the targeted cache entry 18(0)-18(N) could be overwritten with an invalid indicator indicating that the corresponding cache entry 18(0)-18(N) is invalid. The tag parity 82 for the targeted cache entry 18(0)-18(N) could also be overwritten. In this manner, if the valid indicator 24(0)-24(N) flips back to a valid state, such could be detected. The current invalidate interval count 48(0)-48(M) would also not be incremented. In this manner, the ability of the cache memory 12(1) to detect bit flips in other established cache entries 18(0)-18(N) following invalidate operations is not affected, because the current invalidate interval count 48(0)-48(M) that was used to encode the tag parity 82 for the other established cache entries 18(0)-18(N) is not altered.

In this example, an invalidate interval count different from the current invalidate interval count 48(0)-48(M) could be used to encode the redundant information indicator 46(1)(0)-46(1)(N) corresponding to the targeted cache entry 18(0)-18

(N) to provide the encoded redundant information indicator 46'(1)(0)-46'(1)(N). For example, an invalidate interval count that is outside of the range of configured count values for the current invalidate interval count 48 may be used to provide the encoded redundant information indicator 46'(1)(0)-46'(1)(N) corresponding to the targeted cache entry 18(0)-18(N). Otherwise, if the invalidate operation is not of a type that signals the invalidate enable signal 26 and thus does not advance the current invalidate interval count 48(0)-48(M), a bit flip occurring in the valid indicator 24(0)-24(N) for the targeted cache entry 18(0)-18(N) invalidated may go undetected by the redundant information indicator validation circuit 30(1).

Figure 10:
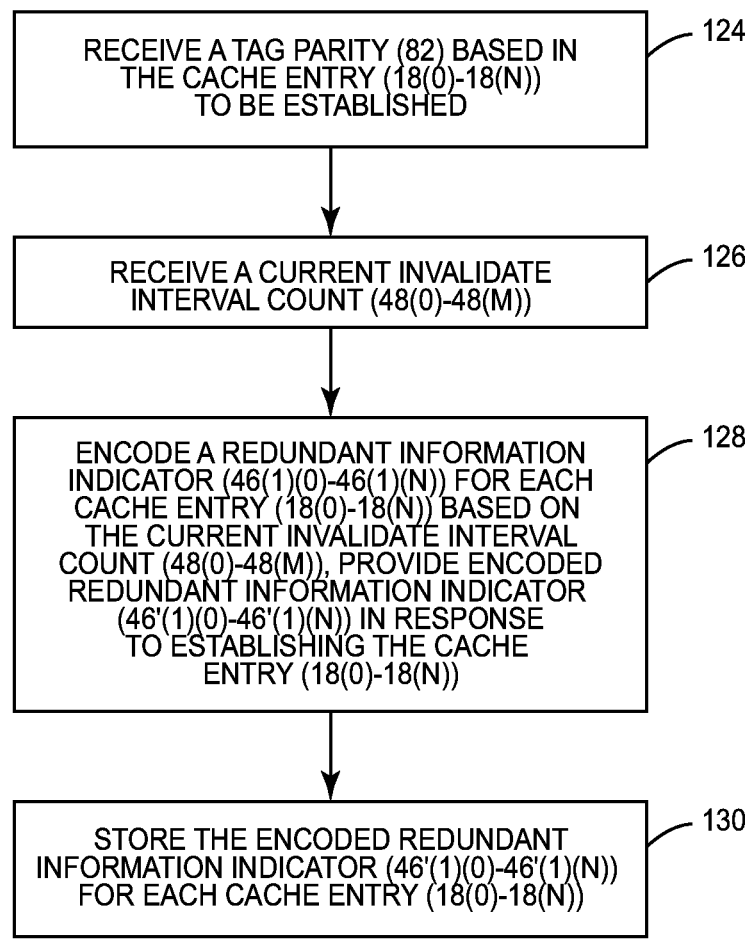
FIG. 10 is a flowchart illustrating an exemplary process of the redundant information indicator generation circuit in FIG. 9 receiving a current invalidate interval state from the invalidate interval indicator to be encoded as part of an error detecting code of an established cache entry in the cache memory.

In regard to FIG. 10, a flowchart illustrating an exemplary process of the redundant information indicator generation circuit 60(1) in FIG. 6 receiving the current invalidate interval count 48(0)-48(M) from the invalidate interval counter 50(0)-50(M) to encode in the tag parity 82 of the cache entry 18(0)-18(N) established is provided. The redundant information indicator generation circuit 60(1) is configured to receive the tag parity 82 based on the cache entry 18(0)-18(N) to be established (block 124). The tag parity 82 is generated as an error detecting code 81 by the tag error detecting code generation circuit 84. In addition, the redundant information indicator generation circuit 60(1) is configured to receive the current invalidate interval count 48(0)-48(M) (block 126). The redundant information indicator generation circuit 60(1) is configured to provide the encoded redundant information indicator 46'(1)(0)-46'(1)(N) for each of the cache entries 18(0)-18(N) based on the current invalidate interval count 48(0)-48(M), in response to establishing the cache entry 18(0)-18(N) (block 128). In this example, as described above, the encoding comprises using an "exclusive or" function to encode the invalidate interval count 48(0)-48(M) with the tag parity 82 as described in FIGS. 6 and 9. Once encoded, the encoded redundant information indicator 46'(1)(0)-46'(1)(N) for each of the cache entries 18(0)-18(N) is stored in the tag array 14 corresponding to each of the cache entries 18(0)-18(N) (block 130). The stored encoded redundant information indicator 46'(1)(0)-46'(1)(N) will be used by the redundant information indicator validation circuit 30(1) to detect a bit flip in the valid indicator 24(0)-24(N).

Figure 11:
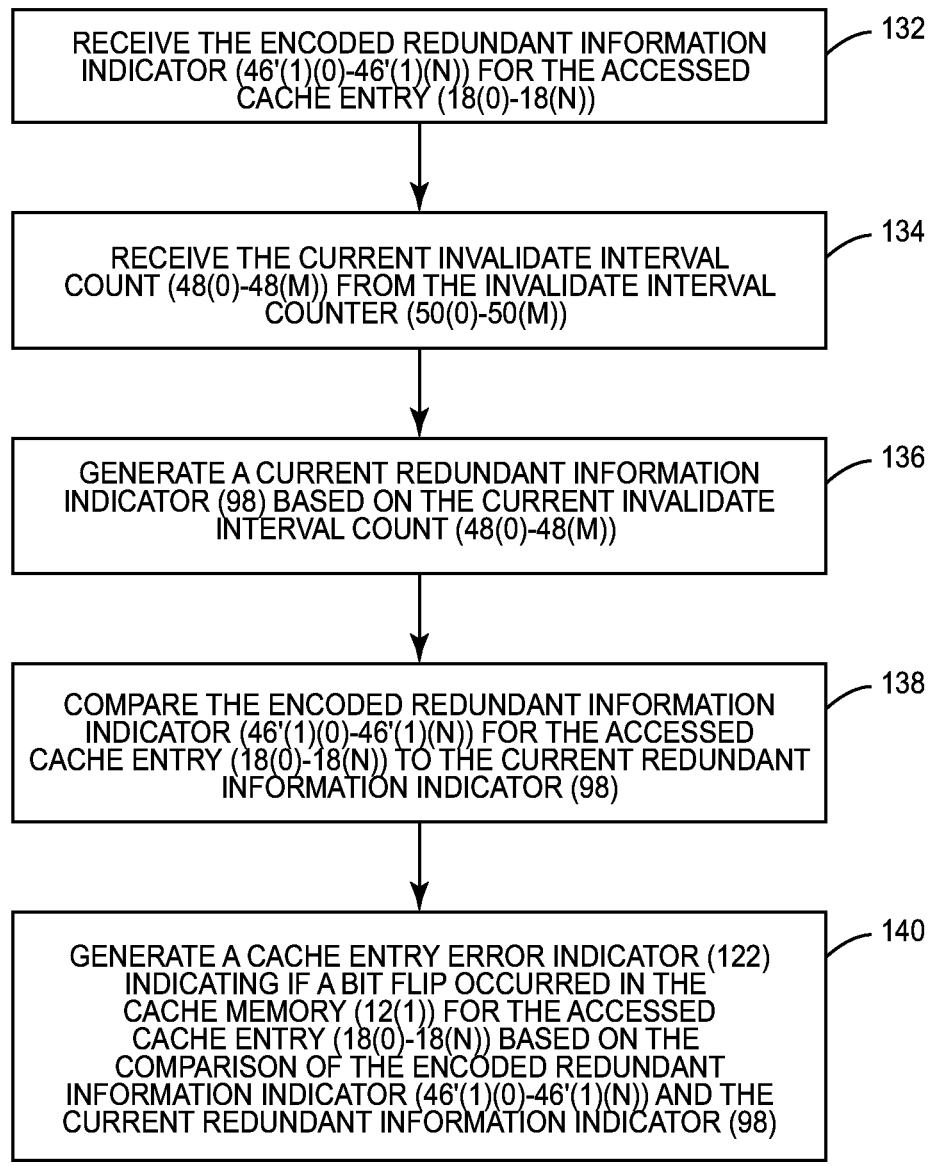
FIG. 11 is a flowchart illustrating an exemplary process of the redundant information indicator validation circuit in FIG. 8 detecting if a bit flip has occurred in a valid indicator of the accessed cache entry in the cache memory based on the redundant information indicator encoded with the invalidate interval state of an established cache entry and the current invalidate interval state in the invalidate interval indicator.

In regard to FIG. 11, a flowchart illustrating an exemplary process of the redundant information indicator validation circuit 30(1) in FIG. 6 is provided. The redundant information indicator validation circuit 30(1) detects if a bit flip has occurred in a valid indicator 24(0)-24(N) of an accessed cache entry 18(0)-18(N) in the cache memory 12(1). The redundant information indicator validation circuit 30(1) detects a bit flip based on the encoded redundant information indicator 46'(1)(0)-46'(1)(N) encoded with the invalidate interval count 48(0)-48(M) during the cache entry 18(0)-18(N) establishment and the current invalidate interval count 48(0)-48(M) in the invalidate interval counter 50(0)-50(M). The redundant information indicator validation circuit 30(1) receives the encoded redundant information indicator 46'(1)(0)-46'(1)(N) for the accessed cache entry 18(0)-18(N) (block 132). The redundant information indicator validation circuit 30(1) additionally receives the current invalidate interval count 48(0)-48(M) from the invalidate interval counter 50(0)-50(M) (block 134). The redundant information indicator validation circuit 30(1) then generates a current redundant information indicator 98 (as shown in FIG. 8) based on the current invalidate interval count 48(0)-48(M) (block 136). The redundant information indicator compare circuit 100 compares the encoded redundant information indicator 46'(1)(0)-46'(1)(N) for the accessed cache entry 18(0)-18(N) to the current redundant information indicator 98 (block 138). Based on the comparison, the redundant information indicator compare circuit 100 generates a cache entry error indicator 122 if a bit flip occurred in the valid indicator 24(0)-24(N) for the accessed cache entry 18(0)-18(N) based on the comparing of the encoded redundant information indicator 46'(1)(0)-46'(1)(N) and the current redundant information indicator 98 (block 140).

Cache memory error detection circuits for detecting bit flips in valid indicators in cache memory following invalidate operations, and related methods and processor-based systems according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 12:
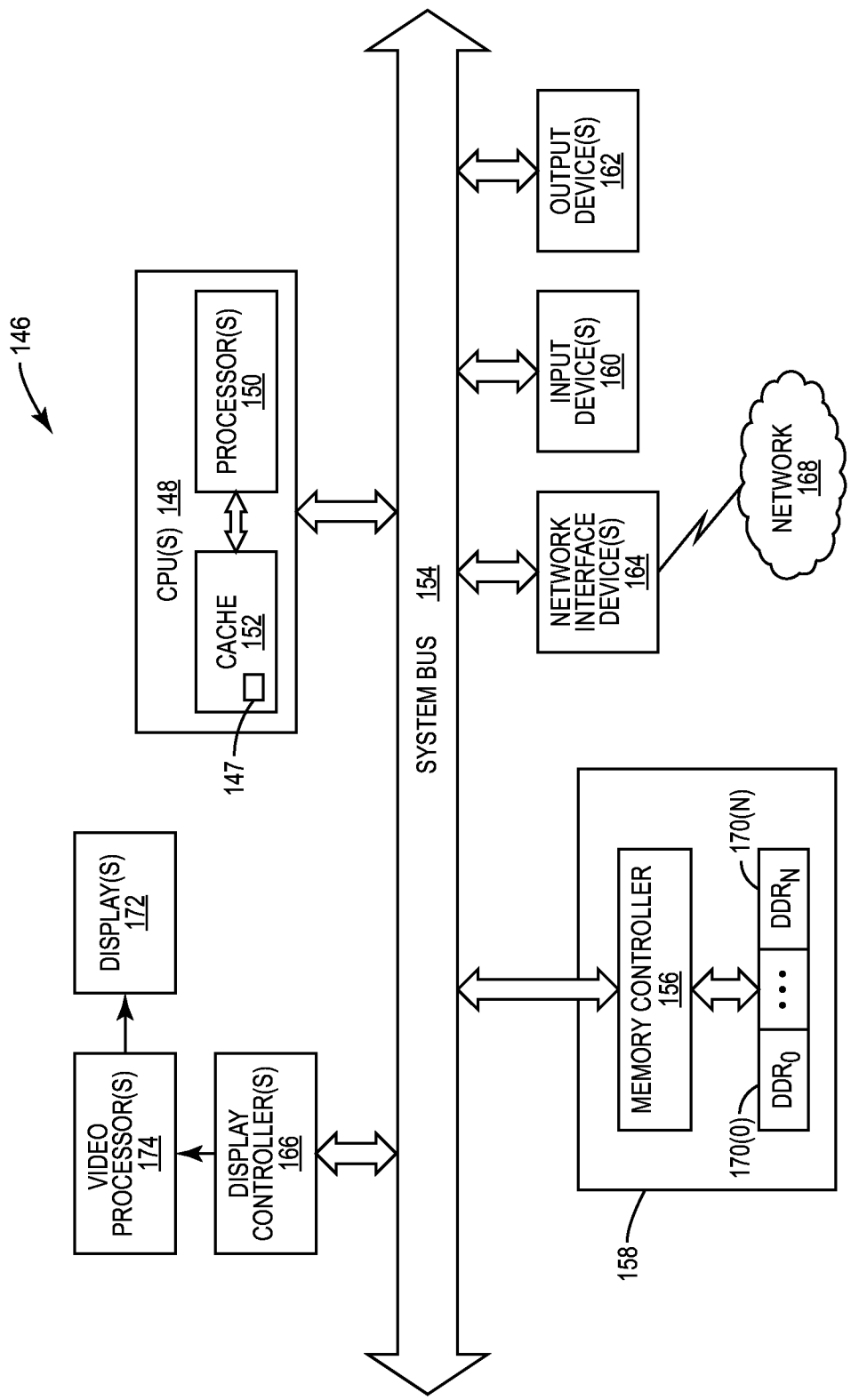
FIG. 12 is a block diagram of an exemplary processor-based system that can include cache memory that includes any cache memory error detection circuit configured to detect bit flips in valid indicators in the cache memory following invalidate operations performed on cache entries of the cache memory.

In this regard, FIG. 12 illustrates an example of a processor-based system 146 that can employ a cache memory error detection circuit 147, which can include any of the cache memory error detection circuits 10, 10(1), and 10(2) in FIGS. 1, 6, and 12, respectively, as non-limiting examples, for detecting bit flips in valid indicators (e.g., valid bits) in cache memory following invalidate operations. In this example, the processor-based system 146 includes one or more CPUs 148, each including one or more processors 150. The CPU(s) 148 may have cache memory 152 coupled to the processor(s) 150 for rapid access to temporarily stored data. The CPU(s) 148 is coupled to a system bus 154 and can intercouple master and slave devices included in the processor-based system 146. As is well known, the CPU(s) 148 communicates with these other devices by exchanging address, control, and data information over the system bus 154. For example, the CPU(s) 148 can communicate bus transaction requests to a memory controller 156 as an example of a slave device. Although not illustrated in FIG. 12, multiple system buses 154 could be provided, wherein each system bus 154 constitutes a different fabric.

Other master and slave devices can be connected to the system bus 154. As illustrated in FIG. 12, these devices can include a memory system 158, one or more input devices 160, one or more output devices 162, one or more network interface devices 164, and one or more display controllers 166, as examples. The input device(s) 160 can include any type of input device, including but not limited to input keys, switches, voice processors, etc. The output device(s) 162 can include any type of output device, including but not limited to audio, video, other visual indicators, etc. The network interface device(s) 164 can be any devices configured to allow exchange of data to and from a network 168. The network 168 can be any type of network, including but not limited to a wired or wireless network, a private or public network, a local area network (LAN), a wide local area network (WLAN), and the Internet. The network interface device(s) 164 can be configured to support any type of communication protocol desired. The memory system 158 can include one or more memory units 170(0-N).

The CPU(s) 148 may also be configured to access the display controller(s) 166 over the system bus 154 to control information sent to one or more displays 172. The display controller(s) 166 sends information to the display(s) 172 to be displayed via one or more video processors 174, which process the information to be displayed into a format suitable for the display(s) 172. The display(s) 172 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A cache memory error detection circuit for detecting bit flips in a valid indicator in cache memory, comprising:
    at least one invalidate interval indicator configured to advance an invalidate interval state based on an invalidate operation performed in a cache memory;
    a redundant information indicator generation circuit configured to generate a redundant information indicator for each of an at least one cache entry based on the invalidate interval state, in response to establishment of the at least one cache entry in the cache memory; and
    at least one redundant information indicator validation circuit configured to, in response to a valid indicator for an accessed cache entry in the cache memory indicating a valid state:
        receive the redundant information indicator for the accessed cache entry in the cache memory;
        receive the invalidate interval state from the at least one invalidate interval indicator;
        generate a current redundant information indicator based on the invalidate interval state;
        compare the redundant information indicator for the accessed cache entry to the current redundant information indicator; and
        generate a cache entry error indicator indicating if a bit flip occurred in the accessed cache entry based on the comparison of the redundant information indicator and the current redundant information indicator.

2. The cache memory error detection circuit of claim 1, wherein:
    the at least one invalidate interval indicator is further configured to provide the invalidate interval state as a current invalidate interval state;
    the redundant information indicator generation circuit is configured to generate the redundant information indicator for each of the at least one cache entry based on the current invalidate interval state, in response to establishment of the at least one cache entry in the cache memory; and
    the at least one redundant information indicator validation circuit is configured to:
        receive the invalidate interval state as the current invalidate interval state from the at least one invalidate interval indicator; and
        generate the current redundant information indicator based on the current invalidate interval state.

3. The cache memory error detection circuit of claim 2, wherein the at least one invalidate interval indicator is further configured to provide the invalidate interval state not based on the current invalidate interval state.

4. The cache memory error detection circuit of claim 1, wherein the redundant information indicator generation circuit is further configured to store the redundant information indicator in the at least one cache entry.

5. The cache memory error detection circuit of claim 1, wherein the least one redundant information indicator validation circuit is configured to generate the cache entry error indicator indicating if the bit flip occurred in the accessed cache entry based on the comparison of the redundant information indicator and the current redundant information indicator.

6. The cache memory error detection circuit of claim 1, further comprising a cache hit/miss indicator circuit configured to receive the cache entry error indicator and generate a cache hit/miss indicator based on the received cache entry error indicator.

7. The cache memory error detection circuit of claim 6, wherein the cache hit/miss indicator circuit is configured to:
generate the cache hit/miss indicator as a cache miss if the received cache entry error indicator indicates the bit flip occurred in the accessed cache entry; and
generate the cache hit/miss indicator as a cache hit if the received cache entry error indicator does not indicate that the bit flip occurred in the accessed cache entry.

8. The cache memory error detection circuit of claim 1, wherein the at least one invalidate interval indicator is further configured to receive an invalidate enable signal on an invalidate enable input indicating the invalidate operation on the cache memory.

9. The cache memory error detection circuit of claim 1, wherein the redundant information indicator is comprised of the invalidate interval state.

10. The cache memory error detection circuit of claim 1, wherein the at least one redundant information indicator validation circuit is further configured to generate the redundant information indicator as an encoded redundant information indicator in an error detecting code generated for the at least one cache entry.

11. The cache memory error detection circuit of claim 10, wherein the at least one redundant information indicator validation circuit comprises:
the redundant information indicator generation circuit configured to:
receive the encoded redundant information indicator for the accessed cache entry in the cache memory;
receive the invalidate interval state from the at least one invalidate interval indicator; and
generate the current redundant information indicator based on the invalidate interval state; and
a redundant information indicator compare circuit configured to:
compare the encoded redundant information indicator for the accessed cache entry to the current redundant information indicator; and
generate the cache entry error indicator indicating if the bit flip occurred in the accessed cache entry based on the comparison of the encoded redundant information indicator and the current redundant information indicator.

12. The cache memory error detection circuit of claim 1, wherein the redundant information indicator generation circuit is included in an error detecting code generation circuit.

13. The cache memory error detection circuit of claim 1, wherein the at least one invalidate interval indicator is further configured to advance the invalidate interval state over an invalidate interval state range based on an invalidate interval configuration setting.

14. The cache memory error detection circuit of claim 1, wherein:
the at least one cache entry is comprised of a plurality of cache entries, and wherein the at least one invalidate interval indicator is comprised of a plurality of invalidate interval indicators each having an associated invalidate interval state, each of the plurality of invalidate interval indicators associated with a selective group of the at least one cache entry among the plurality of cache entries; and
the plurality of invalidate interval indicators are each configured to advance the associated invalidate interval state based on the invalidate operation performed on the selective group of the at least one cache entry associated with a corresponding one of the plurality of invalidate interval indicators.

15. The cache memory error detection circuit of claim 14, wherein each of the plurality of invalidate interval indicators is configured to advance the associated invalidate interval state based on a flash invalidate operation performed on the cache memory.

16. The cache memory error detection circuit of claim 14, wherein an invalidate interval indicator among the plurality of invalidate interval indicators is configured to advance the associated invalidate interval state based on a selective invalidate operation on the selective group of the at least one cache entry associated with the corresponding one of the plurality of invalidate interval indicators.

17. The cache memory error detection circuit of claim 1, wherein the at least one redundant information indicator validation circuit is comprised of a plurality of redundant information indicator validation circuits, wherein the at least one invalidate interval indicator is configured to provide the invalidate interval state to the plurality of redundant information indicator validation circuits.

18. The cache memory error detection circuit of claim 1, wherein:
the at least one invalidate interval indicator is further configured to not advance the invalidate interval state based on the invalidate operation performed on a targeted cache entry in the cache memory; and
the redundant information indicator generation circuit is further configured to generate a redundant information indicator for the targeted cache entry based on a state that is not the invalidate interval state, in response to establishment of the targeted cache entry in the cache memory.

19. The cache memory error detection circuit of claim 1 integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

20. A cache memory error detection circuit for detecting bit flips in a valid indicator in cache memory, comprising:
a means for advancing an invalidate interval state based on an invalidate operation performed on a cache memory;
a means for generating a redundant information indicator for each of an at least one cache entry in the cache memory based on the invalidate interval state, in response to establishment of the at least one cache entry; and a means for, in response to a valid indicator for an accessed cache entry in the cache memory indicating a valid state:
- receiving the redundant information indicator for the accessed cache entry in the cache memory;
- receiving the invalidate interval state;
- generating a current redundant information indicator based on the invalidate interval state;
- comparing the redundant information indicator for the accessed cache entry to the current redundant information indicator; and
- generating a cache entry error indicator indicating if a bit flip occurred in the accessed cache entry based on the comparison of the redundant information indicator and the current redundant information indicator.

21. A method of detecting cache memory errors from bit flips in a valid indicator in cache memory following invalidate operations, comprising:
- advancing an invalidate interval state of at least one invalidate interval indicator based on an invalidate operation performed on a cache memory;
- generating a redundant information indicator for each of an at least one cache entry in the cache memory based on the invalidate interval state, in response to establishing the at least one cache entry;
- in response to a valid indicator for an accessed cache entry in the cache memory indicating a valid state:
  - receiving the redundant information indicator for the accessed cache entry in the cache memory;
  - receiving the invalidate interval state from the at least one invalidate interval indicator;
  - generating a current redundant information indicator based on the invalidate interval state;
  - comparing the redundant information indicator for the accessed cache entry to the current redundant information indicator;
  - generating a cache entry error indicator indicating if a bit flip occurred in the accessed cache entry based on the comparing of the redundant information indicator and the current redundant information indicator.

22. The method of claim 21, further comprising storing the redundant information indicator in the at least one cache entry.

23. The method of claim 21, wherein generating the cache entry error indicator indicating if the bit flip occurred in the accessed cache entry further comprises generating the cache entry error indicator indicating if the bit flip occurred in a valid indicator for the accessed cache entry based on the comparing of the redundant information indicator and the current redundant information indicator.

24. The method of claim 23, further comprising generating a cache hit/miss indicator for the cache memory based on the cache entry error indicator.

25. The method of claim 24, wherein generating the cache hit/miss indicator for the cache memory comprises generating a cache miss if the received cache entry error indicator indicates the bit flip occurred in the accessed cache entry.

26. The method of claim 21, wherein generating the current redundant information indicator comprises generating the current redundant information indicator as the invalidate interval state.

27. The method of claim 21, wherein generating the current redundant information indicator further comprises generating the redundant information indicator as an encoded redundant information indicator in an error detecting code generated for the at least one cache entry.

28. A non-transitory computer-readable medium having stored thereon computer executable instructions to cause a processor-based cache memory error detection circuit to detect bit flips in a valid indicator in cache memory, by:
- advancing an invalidate interval state of at least one invalidate interval indicator based on an invalidate operation performed on a cache memory;
- generating a redundant information indicator for each of an at least one cache entry in the cache memory based on the invalidate interval state, in response to establishing the at least one cache entry;
- in response to a valid indicator for an accessed cache entry in the cache memory indicating a valid state:
  - receiving the redundant information indicator for the accessed cache entry in the cache memory;
  - receiving the invalidate interval state from the at least one invalidate interval indicator;
  - generating a current redundant information indicator based on the invalidate interval state;
  - comparing the redundant information indicator for the accessed cache entry to the current redundant information indicator; and
  - generating a cache entry error indicator indicating if a bit flip occurred in the accessed cache entry based on the comparing of the redundant information indicator and the current redundant information indicator.

* * * * *